United States Patent
Fetters et al.

(10) Patent No.: US 11,075,933 B1
(45) Date of Patent: Jul. 27, 2021

(54) ABNORMAL USER BEHAVIOR DETECTION

(71) Applicant: CA, Inc., San Jose, CA (US)

(72) Inventors: Brandon Fetters, Highlands Ranch, CO (US); Yufei Han, Antibes (FR); Xiaolin Wang, San Jose, CA (US)

(73) Assignee: CA, Inc., San Jose, CA (US)

( * ) Notice: Subject to any disclaimer, the term of this patent is extended or adjusted under 35 U.S.C. 154(b) by 315 days.

(21) Appl. No.: 16/366,092

(22) Filed: Mar. 27, 2019

(51) Int. Cl.
*H04L 29/06* (2006.01)
*H04L 29/08* (2006.01)

(52) U.S. Cl.
CPC .......... *H04L 63/1425* (2013.01); *H04L 63/20* (2013.01); *H04L 67/10* (2013.01)

(58) Field of Classification Search
CPC ...... H04L 67/10; H04L 63/20; H04L 63/1425
See application file for complete search history.

(56) References Cited

U.S. PATENT DOCUMENTS

| | | | | |
|---|---|---|---|---|
| 2002/0157478 A1* | 10/2002 | Seale | ........................ | G01N 3/00 73/789 |
| 2014/0122586 A1* | 5/2014 | Kao | ........................ | G06Q 50/01 709/204 |
| 2015/0254509 A1* | 9/2015 | Ho | ..................... | G06K 9/00617 382/117 |
| 2017/0234956 A1* | 8/2017 | Feiweier | .......... | G01R 33/56341 324/309 |
| 2018/0359272 A1* | 12/2018 | Mizrachi | ................. | G06F 21/57 |

OTHER PUBLICATIONS

Bokai Cao, Chun-Ta Lu, Xiaokai Wei, Philip S. Yu and Alex D. Leow. Semi-supervised Tensor Factorization for Brain Network Analysis. ECML-PKDD, European Conference, Riva del Garda, Italy (2016) vol. 9851, pp. 17-32.

Yejin Kim, Robert El-Kareh, Jimeng Sun, Hwanjo Yu and Xiaoqian Jiang. Discriminative and Distinct Phenotyping by Constrained Tensor Factorization. Scientific Reports 7, Article No. 1114 (2017) Springer Nature: London, England.

Sunny Verma, Wei Liu, Chen Wang and Liming Zhu. Extracting Highly Effective Features for Supervised Learning via Simultaneous Tensor Factorization. 31st AAAI Conference, Sydney, Australia (2017) pp. 4995-4996.

Changhu Wang, Shuicheng Yan, Lei Zhang and Hong-Jiang Zhang. Non-Negative Semi-Supervised Learning. 12th AISTATS Conference, Clearwater Beach, Florida, USA (2009) vol. 5, pp. 575-582.

(Continued)

*Primary Examiner* — El Hadji M Sall
(74) *Attorney, Agent, or Firm* — Shook, Hardy & Bacon L.L.P.

(57) ABSTRACT

A method for detecting and protecting against abnormal user behavior is described. The method may include generating a tensor model based on a set of user information within a temporal period. The tensor model may include a behavioral profile associated with a user of a set of users. In some examples, the method may include determining that a behavior associated with the user of the set of users is abnormal based on the tensor model, adapting the tensor model based on feedback from an additional user of a set of additional users different from the set of users, and performing a security action on at least one computing device to protect against the abnormal user behavior based on the adapting.

20 Claims, 11 Drawing Sheets

(56) References Cited

OTHER PUBLICATIONS

Fei Wu, Xu Tan, Yi Yang, Dacheng Tao, Siliang Tang and Yueting Zhuang. Supervised Nonnegative Tensor Factorization with Maximum-Margin Constraint. 27th AAAI Conference, Bellevue, Washington, USA (2013) pp. 962-968.

Miao Zhang and Chris Ding. Robust Tucker Tensor Decomposition for Effective Image Representation. IEEE Conference, Sydney, Australia (2013) pp. 2448-2455.

* cited by examiner

ABNORMAL USER BEHAVIOR DETECTION

FIELD OF TECHNOLOGY

The present disclosure relates generally to cloud platform systems, and more specifically to abnormal user behavior detection.

BACKGROUND

A cloud platform (e.g., a computing platform for cloud computing) may be employed by many users and organizations to store, manage, and process data using a shared network of remote servers. Users and organizations may develop applications on the cloud platform to handle the storage, management, and processing of data. In some cases, the cloud platform may utilize a multi-tenant database system. Users and organizations may access the cloud platform using various user devices (e.g., desktop computers, laptops, smartphones, tablets, or other computing systems, etc.).

The use of cloud platform systems and computer-related technologies continues to increase at a rapid pace. The expansive use of cloud platform systems has influenced the advances made to computer-related technologies. Cloud platform systems have increasingly become an integral part of the business world and the activities of individual consumers. Cloud platform systems may be used to carry out several business, industry, and academic endeavors. The widespread use of cloud platforms across various user devices has caused an increased presence in security threats including data theft, embedding malware and viruses, and the like. Due to security threats in cloud platform systems and computer-related technologies, methods for securing cloud applications may be beneficial in preventing security threats to various user devices and organizations.

SUMMARY

Generally the described techniques relate to improved methods, systems, or devices, that support abnormal user behavior detection of cloud users to detect evolving malicious attacks with an extremely low false positive rate by integrating user feedback to the detection scheme for each user. A method of detecting and protecting against abnormal user behavior is described. The method may include generating a tensor model based on a set of user information within a temporal period, where the tensor model includes a behavioral profile associated with a user of a set of users, determining that a behavior associated with the user of the set of users is abnormal based on the tensor model, adapting the tensor model based on feedback from an additional user of a set of additional users different from the set of users, and performing a security action on at least one computing device of the one or more computing devices to protect the at least one computing device against the abnormal user behavior based on the adapting.

A computing device for detecting and protecting against abnormal user behavior is described. The computing device may include a processor, memory in electronic communication with the processor, and instructions stored in the memory. The instructions may be executable by the processor to cause the apparatus to generate a tensor model based on a set of user information within a temporal period, where the tensor model includes a behavioral profile associated with a user of a set of users, determine that a behavior associated with the user of the set of users is abnormal based on the tensor model, adapt the tensor model based on feedback from an additional user of a set of additional users different from the set of users, and perform a security action on at least one computing device of the one or more computing devices to protect the at least one computing device against the abnormal user behavior based on the adapting.

A non-transitory computer-readable medium storing code for detecting and protecting against abnormal user behavior is described. The code may include instructions executable by a processor to generate a tensor model based on a set of user information within a temporal period, where the tensor model includes a behavioral profile associated with a user of a set of users, determine that a behavior associated with the user of the set of users is abnormal based on the tensor model, adapt the tensor model based on feedback from an additional user of a set of additional users different from the set of users, and perform a security action on at least one computing device of the one or more computing devices to protect the at least one computing device against the abnormal user behavior based on the adapting.

In some examples of the method, computing devices, and non-transitory computer-readable medium described herein, the tensor model includes one or more three-dimensional tensors, at least one of the one or more three-dimensional tensors including a set of user identifiers associated with the set of users, a set of application identifiers used by the set of users, or a set of timestamp identifiers, or any combination thereof.

In some examples of the method, computing devices, and non-transitory computer-readable medium described herein, generating the tensor model may include operations, features, means, or instructions for monitoring, from at least one computing device from the one or more computing devices and associated with the user of the set of users, the set of user information including a user identifier of the user of the set of users, a set of application identifiers associated with one or more applications accessible by the user of the set of users, or a set of timestamp identifiers related to access to the one or more applications by the user of the set of users, or any combination thereof. In some examples of the method, computing devices, and non-transitory computer-readable medium described herein, the set of user information includes the user identifier, the set of application identifiers, or the set of timestamp identifiers, or any combination thereof.

In some examples of the method, computing devices, and non-transitory computer-readable medium described herein, generating the tensor model may include operations, features, means, or instructions for correlating one or more operations associated with the user of the set of users to the one or more applications running on the at least one computing device associated with the user during one or more timestamp periods within the temporal period.

In some examples of the method, computing devices, and non-transitory computer-readable medium described herein, determining the abnormal behavior associated with the user of the set of users may include operations, features, means, or instructions for determining that at least one of the one or more operations satisfy an abnormal behavior threshold.

In some examples of the method, computing devices, and non-transitory computer-readable medium described herein, adapting the tensor model may include operations, features, means, or instructions for transmitting a feedback request message including an indication flagging the abnormal behavior of the user of the set of users and a selectable option to assign a classification to the abnormal behavior by the additional user of the set of additional users. In some examples of the method, computing devices, and non-transitory computer-readable medium described herein, the classification includes at least one of a normal behavior, a non-malicious abnormal behavior, or a malicious abnormal behavior, or any combination thereof.

Some examples of the method, computing devices, and non-transitory computer-readable medium described herein may further include operations, features, means, or instructions for receiving a feedback response message including a second indication including the classification by the additional user of the set of additional users. In some examples of the method, computing devices, and non-transitory computer-readable medium described herein, adapting the tensor model includes updating the tensor model in real-time may be based on the feedback response message.

Some examples of the method, computing devices, and non-transitory computer-readable medium described herein may further include operations, features, means, or instructions for determining a reconstruction error of the behavioral profile associated with the user of the set of users based on the generated tensor model using the set of user information including at least one of a user identifier, a set of application identifiers, or a set of timestamp identifiers, or any combination thereof, determining an anomaly score based on the reconstruction error and a regularization term associated with the set of user information including at least one of a user identifier, a set of application identifiers, or a set of timestamp identifiers, or any combination thereof, and assigning a ranking to the user of the set of users. In some examples of the method, computing devices, and non-transitory computer-readable medium described herein, determining the abnormal behavior associated with the user of the set of users may be further based on the ranking.

Some examples of the method, computing devices, and non-transitory computer-readable medium described herein may further include operations, features, means, or instructions for performing the security action includes at least one of quarantining an application on the at least one computing device related to the abnormal behavior associated with the user, preventing access to a network enterprise for the at least one computing device related to the abnormal behavior associated with the user, preventing access by the user to one or more features of the at least one computing device related to the abnormal behavior associated with the user, performing a malware scan on the at least one computing device at least one computing device related to the abnormal behavior associated with the user, or any combination thereof.

In some examples of the method, computing devices, and non-transitory computer-readable medium described herein, performing the security action may include operations, features, means, or instructions for transmitting a message including an indication of the abnormal behavior associated with the user of the set of users and a selectable option to perform a second security action including at least one of preventing access to a network enterprise for the at least one computing device, preventing access to one or more features of the at least one computing device, or performing a malware scan on the at least one computing device, or any combination thereof, where the indication further includes a user identifier, an application identifier, or a timestamp identifier, or any combination thereof associated with the abnormal behavior.

In some examples of the method, computing devices, and non-transitory computer-readable medium described herein, the set of user information includes one or more interactions of the user of the set of users with one or more cloud-based applications within the temporal period.

In some examples of the method, computing devices, and non-transitory computer-readable medium described herein, the additional user of the set of additional users includes an information security user, and the set of users and at least one of the additional set of users being associated with an enterprise.

DETAILED DESCRIPTION

Figure 1:
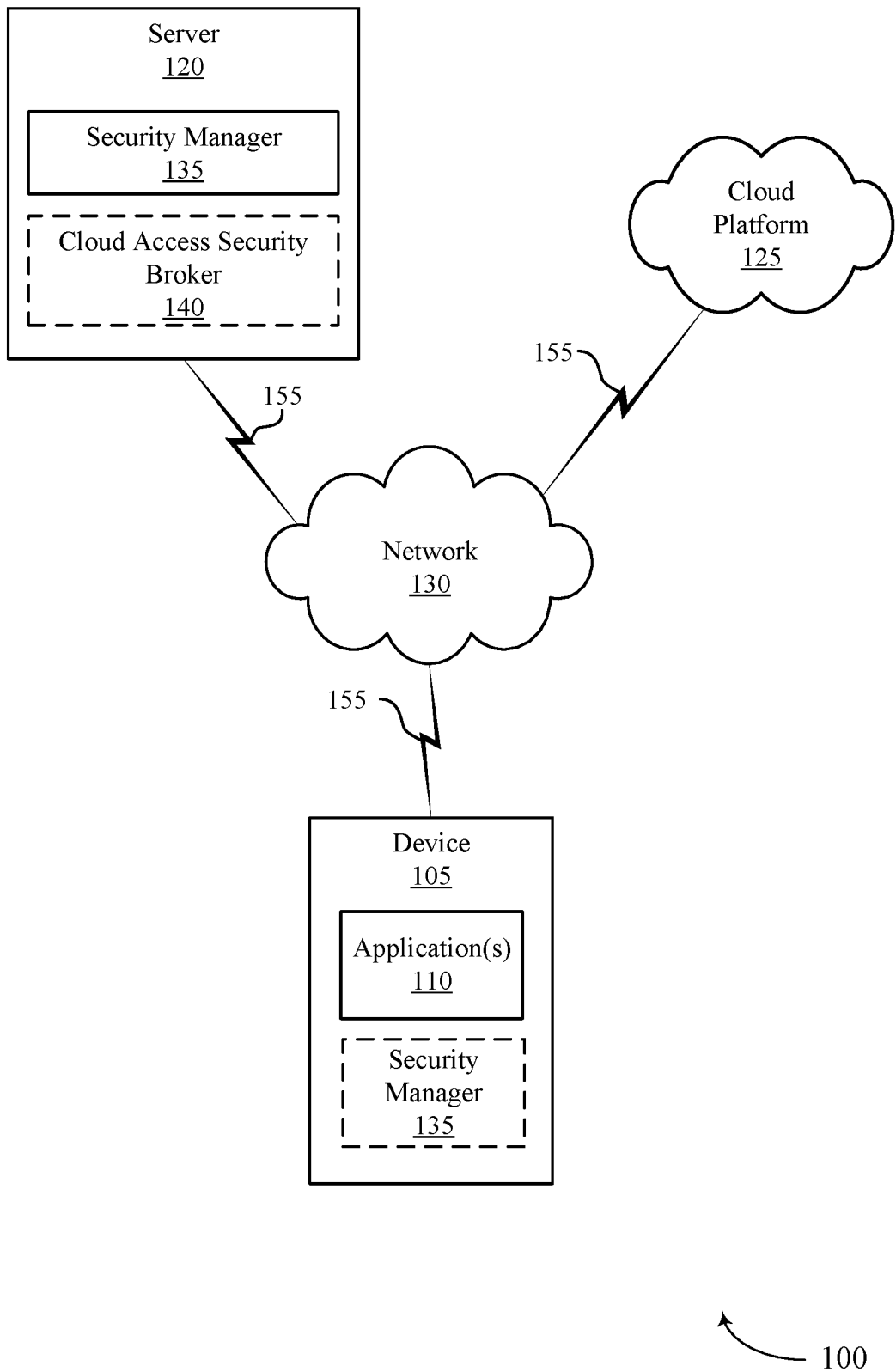
FIG. 1 illustrates a block diagram of an environment that supports abnormal user behavior detection in accordance with aspects of the present disclosure.

The described techniques relate to improved methods, systems, or devices, that support cloud platforms. Some organizations (e.g., corporations, businesses, educational establishments, and the like) may support use of cloud applications to provide access (e.g., to aspects and operations of the organization) to various user devices globally to benefit end user experience and productivity for the organizations. Some present techniques may be effective in preventing security threats including data theft, embedding malware and viruses, and the like on various user devices. For example, the methods, systems, or devices, described herein may support cloud access security brokers (CASB) that may facilitate cloud-based security policies between cloud service clients and cloud service providers to facilitate security policies as clients use cloud-based resources. CASB policies may enable threat protection, which may include applying science-based user-behavior analytics (UBA) to forecast security threats in the cloud and subsequently protect a client's enterprise. Threat protections and predictions may include, but are not limited to, detecting suspicious, abnormal, or anomalous user behavior related to use of one or more cloud applications. By detecting abnormal user behavior, the present techniques may identify actual or potentially compromised users or malicious insiders of the enterprise.

In some examples, detection of abnormal behaviors may enable the prediction of future potential attacks. Remedial security actions may include, but are not limited to, informing enterprises that there may be a potentially malicious insider or a compromised user in order to enable prevention and mitigation of security threats including, for example, data exfiltration. Detection of abnormal behavior may enable an administrator of the enterprise to set up notifications, which may inform a user to perform one or more preventative actions to prevent malicious attacks. In some examples, abnormal behavior may be benign and may be indicative to behavioral drift, as opposed to abnormal usage due to malicious abuse of devices (e.g., various user devices), where behavioral drift may be described as falling into a set of behavioral patterns. The present disclosure, therefore, may detect abnormal behaviors, which may be indicative of malicious actions, and may prevent or mitigate damage to the enterprise by incorporating feedback into the detection of abnormal behaviors to account for behavioral drifts.

Accordingly, benefits of the present disclosure may include enabling a device (e.g., an end user terminal, a server, a network entity, and the like) to determine abnormal user behavior using a learning model (e.g., a machine learning model or a deep learning model, such as a tensor model) and perform one or more security actions to protect the device and enterprise against a potential malevolent attack. Further benefits of the present disclosure may include incrementally integrating user feedback to the learning model via real-time. This may include processing user feedback within milliseconds, so that the user feedback is applicable virtually immediately as feedback input to the learning model, such that the device may adapt the learning model according to the feedback input. The inserted feedback may further help to refine tuning of the learning model (e.g., a tensor factorization-based detection model). Other benefits of the present disclosure may include refraining from deploying a new learning model due to the real-time user feedback applicability.

Other benefits of the present disclosure may include defining a feedback policy for classifying a detected abnormal behavior as potentially a normal behavior, a non-malicious abnormal behavior, or a malicious abnormal behavior, or any combination thereof. Other benefits of the present disclosure may also include enforcing temporal consistency constraints between representation of users in projection space derived from proposed learning model factorization (e.g., tensor factorization). This temporal consistency may further assist in tolerating variation of user behaviors, which may be caused by benign behavior drift. As a result, a false alarm rate can be reduced.

Aspects of the disclosure are initially described in the context of an environment. Aspects are then described with respect to process flow that supports abnormal user behavior detection in accordance with aspects of the present disclosure. Aspects of the disclosure are further illustrated by and described with reference to apparatus diagrams, system diagrams, and flowcharts that relate to abnormal user behavior detection in accordance with aspects of the present disclosure.

FIG. 1 illustrates a block diagram of an environment 100 that supports abnormal user behavior detection in accordance with aspects of the present disclosure. As depicted, the environment 100 may include a device 105, a server 120, and a cloud platform 125. The techniques described herein may be performed on a device (e.g., the device 105 or the server 120, or a combination thereof). In the illustrated embodiment, the device 105, the server 120, and the cloud platform 125 may be communicatively coupled via a network 130 (e.g., via communication links 155).

The device 105 in the environment 100 may be used by way of example. While, the environment 100 illustrates one device 105, the present disclosure applies to any system architecture having one or more devices 105. Furthermore, while a single network is coupled to the device 105, the server 120, and the cloud platform 125, the present disclosure applies to any system architecture having any number of networks that may be communicatively coupled to the device 105, the server 120, and the cloud platform 125. Similarly, while the environment 100 illustrates one server 120, the present disclosure applies to any system architecture having one or more servers.

In some cases, the device 105 or the server 120, or both may include a personal electronic device such as a cellular phone, a personal digital assistant (PDA), a tablet computer, a laptop computer, or a personal computer. The device 105 may include one or more applications 110. The applications 110 may be downloaded, installed, and running on the device 105. The one or more applications 110 may be referred to herein as a cloud application or cloud-based application (e.g., web-based application accessible via a browser of the device 105). A browser may be a software program running on the device 105 that provides an interface for displaying application interfaces, supports navigating the Internet via network 130, and the like.

The device 105 may include a cloud-based application that interfaces with one or more functions of the security manager 135. It is noted that in some examples, the device 105 may not include a security manager 135. For example, the device 105 may include one or more applications 110 that allows the device 105 to interface with the security manager 135 that may be located on another device or the server 120. Although the components of the device 105 are depicted as being internal to the device 105, it is understood that one or more of the components may be external to the device 105 and connect to the device 105 through wired or wireless connections, or both (e.g., via the communication links 155).

The server 120 may be a computing system or an application that may be an intermediary node in the environment 100 between the device 105 and the cloud platform 125. The server 120 may include any combination of a social network server, data server, a cloud server, a server associated with an automation service provider, proxy server, mail server, web server, application server, database server, communications server, file server, home server, mobile server, name server, or any combination thereof. In some examples, the server 120 may include an application distribution platform.

The server 120 may receive a request from the device 105 seeking resources (e.g., to download or access a cloud-based application) from the server 120 and/or the cloud platform 125. In some examples, the device 105 may communicate with the server 120 via the network 130. Examples of the network 130 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some examples, the server 120 may receive requests from the device 105 instructing the server 120 to provide an executable file to install an application (e.g., an application 110) from the application distribution platform (e.g., via the cloud platform 125) to the device 105. For example, a user may, via the device 105, install one or more software applications from the cloud platform 125, which may be hosted by the server 120 via the communication links 155. The user may discover, browse, share, and download software applications from the application distribution platform (e.g., via the cloud platform 125). In some examples, applications offered by the application distribution platform may be characterized based on a category, and the user may select a category to discover and download (e.g., install) an application on the device 105. As such, applications 110 may include at least one example of a cloud-based service or cloud-based application, as described above.

Cloud platform 125 may be an example of a public or private cloud network. The device 105 may also be referred to here as a cloud client, which may access the cloud platform 125 over network 130. The network 130 may implement transfer control protocol and internet protocol (TCP/IP), such as the Internet, or may implement other network protocols. In some examples, the device 105 may be operated by an end user that is part of a business, an enterprise, a non-profit, a startup, or any other organization type. A cloud client may access the cloud platform 125 to store, manage, and process data associated with an application 110. In some examples, the device 105 may have an associated security or permission level where access to data may be limited based on a policy associated with one or more user accounts (e.g., a first permission level for a first user and a second permission level for a second user where access of the first permission level is limited to the same or a different access as the second permission level).

A cloud client may have access to certain applications, data, and database information within the cloud platform 125 based on the associated security or permission level, and may not have access to others. The cloud platform 125 may offer an on-demand database service to the device 105. In some examples, the cloud platform 125 may be an example of a multi-tenant database system. In these examples, the cloud platform 125 may serve multiple cloud clients with a single instance of software. However, other types of systems may be implemented, including—but not limited to—client-server systems, mobile device systems, and mobile network systems.

The server 120 may include a security manager 135, which may be an example of aspects of a security manager as described herein. Additionally, or alternatively, the device 105 may include a security manager 135, which may be an example of aspects of a security manager as described herein. In some examples, at least a portion of the functions of the security manager 135 may be performed separately or concurrently on the device 105 or the server 120. Some organizations (e.g., companies, industries, and the like) may support use of cloud applications (e.g., applications 110) to provide access to aspects and operations of the organization to various devices 105.

The security manager 135 may be effective in preventing security threats including data theft, embedding malware and viruses, and the like on various user devices. In some examples, the server 120 may include a cloud access security broker (CASB) 140 that may enable cloud-based security policies between cloud service clients and cloud service providers to facilitate security policies as users use cloud-based resources. CASB policies may enable threat protection, which may include applying science-based UBA to forecast security threats in the cloud platform 125 and subsequently protect various user devices, such as the device 105. Threat protections and predictions may include, but are not limited to, detecting suspicious, abnormal, or anomalous user behavior related to use of one or more applications 110, for example cloud-based applications. By detecting abnormal user behavior, the present techniques may identify actual or potentially compromised users or malicious users.

In some examples, detection of abnormal behaviors may enable the prediction of future potential threats. The security manager 135 may support remedial security actions that may include informing administrative users or security information users that there may be a potential malicious insider or a compromised user, in order to enable prevention and mitigation of security threats. In some examples, the security manager 135 may support execution of a learning model (e.g., a detection algorithm) to detect anomalies and patterns of behavior for one or more users. In some examples, each user may be one of a set of users within an enterprise.

Malicious behavior may be constantly changing and evolving, and thus the detection of abnormal behavior may be important for detecting potential security threat. In some examples, the security manager 135 may use a tensor model as the learning model to at least differentiate normal user behavior (including variations of normal user behavior or behavioral drift) from abnormal user behavior, truly malicious behavior, and determine an anomaly score for each user, where the anomaly score may be used to rank the abnormal behavior of each user. It should be understood that other learning models, such as deep learning models, convolution models, and the like are applicable to the present disclosure and should not be limited to tensor models.

Cloud services may provide a platform for a user to exhibit any number of behaviors or take any number of actions. For example, a user using a cloud-based application may perform certain operations within the cloud-based application. In another example, the user may utilize a different cloud-based application, such as document cloud-based application and may participate in data entry throughout a regular work day, including downloading files throughout the day. A user behavior may exhibit a similar pattern over time. Similarly, a user may have a similar role to a previous user, and thus, the expected behavior may be a function of the pattern of a similarly situated previous user. Over a period of time, such as days within a month, a user behavior may be expected to follow a similar pattern. Thus, over a series of timesteps (e.g., hour-to-hour, day-to-day) a user behavioral pattern may not exhibit an abnormal change over a series of timesteps.

In some examples, a user may not have exactly the same behavior, in exactly the same sequence from timestep to timestep, and thus there may be a temporal dependence between timesteps, with a threshold amount of change for user behaviors within a time window (e.g., temporal period) over a number of timesteps. That is, a user that normally access certain features of an application during a single day, may have an increased number of accesses to the certain features of the application during a different day. For example, a user may delete a file every hour normally, but may delete many files at the end of the day as he or she is organizing the day's work. Such abnormal behaviors may be expected and may not be dramatic enough to be considered a security threat. Abnormal user behaviors, however, may be indicative of a security threat. For example, if a user associated with the device 105 deletes or manipulates a number of files (e.g., data) over a single timestep, the behavior may be more likely than not an abnormal behavior due to a potential security threat.

In some examples, an abnormal behavior may be benign and may be indicative to behavioral drift, as opposed to abnormal usage due to malicious abuse of devices (e.g., various user devices), where behavioral drift may be described as falling into a set of behavioral patterns. The security manager 135 may determine a behavioral drift of a user. If the device 105 is compromised by an outsider or an insider, the operations performed by a user (e.g., user behaviors) may fall into unexpected and abnormal behavior patterns, thus, the security manager 135 may differentiate normal behavior from unexpected abnormal behavior patterns. For example, the security manager 135 may generate a learning model (e.g., global detection model of all of users of an enterprise). The learning model may provide a general baseline of user behavior as a whole within an enterprise in order to determine normal and expected behaviors and differentiate between normal behavior and abnormal behavior, or the like. In some examples, the learning model may provide a general baseline for every individual user associated with the enterprise. In some examples, the learning model may provide a general baseline for subgroups of users within the enterprise, where subgroups may have different normal behavioral patterns.

It may be difficult, in some examples, to differentiate between a true anomaly from benign behavioral drifting based on user behavior profiling. The security manager 135, therefore, may support detecting abnormal behaviors, which may be indicative of malicious actions, and may prevent or mitigate damage to the enterprise by incorporating user feedback into the learning model for the detection of abnormal behaviors to account for the behavioral drifts. For example, the security manager 135 may generate a learning model, such as a tensor model based on a set of user information within a temporal period. In some examples, the feedback may be telemetry data or analyzed telemetry data.

As part of generating the tensor model, the security manger 135 may obtain, collect, and monitor, from the device 105 associated with a user, the set of user information, which may include a user identifier of the user, a set of application identifiers associated with one or more applications 110 accessible by the user, or a set of timestamp identifiers related to access to the one or more applications 110 by the user, or any combination thereof. In some examples, as part of generating the tensor model, the security manger 135 may correlate one or more operations associated with the user to the one or more applications 110 running on the device 105 during one or more timestamp periods within the temporal period. The tensor model may include one or more three-dimensional tensors. In some cases, at least one of the one or more three-dimensional tensors may include a set of user identifiers associated with the set of users, a set of application identifiers used by the set of users, or a set of timestamp identifiers, or any combination thereof, as described with reference to FIG. 2.

The security manger 135 may, based in part on the tensor model, determine that a behavior associated with the user is abnormal. For example, the security manager 135 may determine, based in part on the tensor model, that at least one of the one or more operations satisfy an abnormal behavior threshold. In some examples, the security manger 135 may determine a reconstruction error of the behavioral profile associated with the user of the set of users, determine an anomaly score based in part on the reconstruction error and a regularization term associated with the set of user information to assign a ranking to the user. In these examples, the security manger 135 may determine that the behavior associated with the user is abnormal based on the ranking. In some examples with multiple users determined to have abnormal behavior, the security manger 135 may generate a list of the users, where each user is has a certain ranking.

In some examples, upon determining that the one or more operations satisfy the abnormal behavior threshold, the security manger 135 may transmit a feedback request message, to an additional user, including an indication flagging the abnormal behavior of the user and a selectable option to assign a classification to the abnormal behavior by the additional user. For example, the security manger 135 may transmit the feedback request message to a security information user to evaluate and classify (e.g., label) the abnormal behavior (e.g., event) as at least one of a normal behavior, a non-malicious abnormal behavior, or a malicious abnormal behavior, or any combination thereof. In some examples, the security manger 135 may receive a feedback response message including a second indication including the classification by the additional user.

The security manger 135 may, based in part on the feedback response message, adapt the tensor model in real-time and perform a security action on the device 105 to protect the device 105 against the abnormal user behavior based on the adapting. In some examples, performing the security action may include the security manger 135 quarantining an application 110 on the device 105 related to the abnormal behavior associated with the user. In other examples, performing the security action may include the security manger 135 preventing access to a network enterprise for the device 105 related to the abnormal behavior associated with the user. In some other examples, performing the security action may include the security manger 135 preventing access by the user to one or more features of the device 105 related to the abnormal behavior associated with the user, or performing a malware scan on the device 105.

Accordingly, benefits of the present disclosure may include enabling a device (e.g., an end user terminal, a server, a network entity, and the like) to determine abnormal user behavior using a learning model (e.g., a deep learning model, such as a tensor model) and perform one or more security actions to protect the device and enterprise against a potential malevolent attack. Further benefits of the present disclosure may include incrementally integrating user feedback to the learning model via real-time. This may include processing user feedback within milliseconds, so that the user feedback is applicable virtually immediately as feedback input to the learning model, such that the device may adapt the learning model according to the feedback input. The inserted feedback may further help to refine tuning of the learning model (e.g., a tensor factorization-based detection model). Other benefits of the present disclosure may include refraining from deploying a new learning model due to the real-time user feedback applicability.

Other benefits of the present disclosure may include defining a feedback policy for classifying a detected abnormal behavior as potentially a normal behavior, a non-malicious abnormal behavior, or a malicious abnormal behavior, or any combination thereof. Other benefits of the present disclosure may also include enforcing temporal consistency constraints between representation of users in projection space derived from proposed learning model factorization (e.g., tensor factorization). This temporal consistency may further assist in tolerating variation of user behaviors, which may be caused by benign behavior drift. As a result, a false alarm rate can be reduced.

Figure 2:
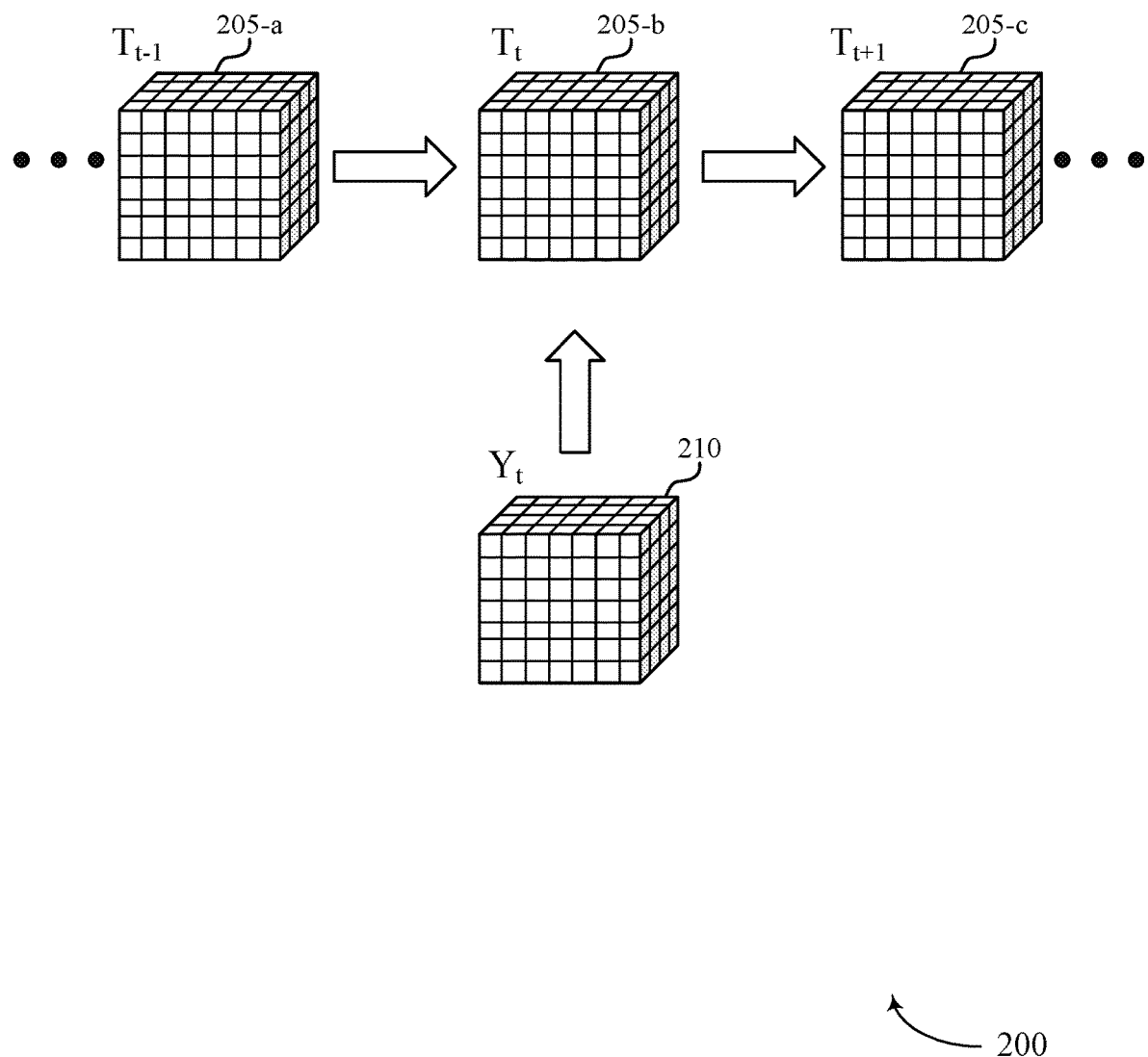
FIG. 2 illustrates a tensor model that supports abnormal user behavior detection in accordance with aspects of the present disclosure.

FIG. 2 illustrates a tensor model 200 that supports abnormal user behavior detection in accordance with aspects of the present disclosure. In some examples, the tensor model 200 may implement aspects of the environment 100. For example, the tensor model 200 may be a learning model, which may collect and correlate user information about a user behaviors, operations, actions, etc. and differentiate temporal drifting of normal behavior from abnormal behavior. The tensor model 200 may use temporal regularization in order to track normal user behavior and determine abnormal user patterns using temporal correlation, for example, over a time window.

The tensor model 200 may include one or more three-dimensional tensors 205. By way of example, the tensor model 200 may include three-dimensional tensor 205-a, tensor 205-b, and tensor 205-c. In some examples, a canonical polyacid (CP) decomposition of a three-dimensional tensor 205 of the tensor model 200 may be represented as follows:

$$T_i = U_i \times V_i \times W_i \quad (1)$$

where $U_i$ is a matrix representing a number of users (e.g., $n_{user} \times k_{factor}$ matrix), $V_i$ is a matrix representing a number of applications (including operations per user) (e.g., $n_{applications} \times k_{factor}$ matrix), and $W_i$ is a matrix representing a number of timesteps (e.g., $n_{timesteps} \times k_{factor}$ matrix). Thus, each three-dimensional tensor 205 may represent a three-dimensional relationship storing users operations and behaviors across applications (e.g., applications 110) during one or more timesteps. For example, according to (1): a first dimension ($U_i$) of a three-dimensional tensor 205 may represent a number of users, a second dimension ($V_i$) of a three-dimensional tensor 205 may represent a number of applications (e.g., operations within an application per user), and a third dimension ($W_i$) of a three-dimensional tensor 205 may represent a number of timesteps within a time window. The operations and/or behaviors, for example, may be associated with a user over a series of timesteps (e.g., $T_n$) over a series of time windows. In some examples, a timestep may be within a time window. For example, a timestep may be a first unit of time such as a second, minute, hour, or day, while a time window may be a second unit of time such as a day, a week, a month, or year etc.

The tensor model 200 may be generated using a set of user information by monitoring and collecting user information from a set of users, as well as with respect to an individual user. In one example, a database may store the user information of the set of users (e.g., one or more users, or all users, of the same enterprise or organization, etc.). In an alternative or additional example, the database may store the user information of a subset of the cloud users of the enterprise. Thus, the tensor model 200 may obtain data from a database related to, for example, the number of users (e.g., overall, in subsets, individually), the number and type of operations and behaviors carried out by each of the users or a group of the users, and the timesteps of each operation.

In some examples, the tensor model 200 may construct a temporal dependence regulation function between successive timesteps, where future user behavior may be predictable based on precedent observation, and where some amount of variation in user behavior from each timestep to a subsequent timestep may be forecasted (estimated, predicted). For example, the temporal dependence regulation function may estimate (e.g., predict, forecast, etc., based on one or more calculations, execution of an algorithm, etc.) that between each successive timestep there may be some change in user behavior that may not be drastic enough (e.g., based on determining whether a threshold is satisfied) to be considered abnormal behavior. In some examples, it may be expected that user behavioral drift is smooth (e.g., does not have drastic variation) at successive timesteps (e.g., $T_{t-1}, T_t, T_{t+1}$). Given the combination of temporal dependence regulation and temporal smoothness, normal user behavior changes may be tracked and abnormal behaviors may be determined. The tensor model 200, therefore, may model the average and variance of the normal dynamic patterns of drifting of normal behavioral profiles to determine abnormalities. The tensor model 200 may support a three-dimensional user feedback tensor 210 (e.g., $Y_t$). Thus, the tensor model 200 may support enhanced detection of abnormal user behavior according to user feedback and temporal correlation.

In some examples, the tensor factorization of a three-dimensional tensor tensor 205 can be represented as follows:

$$U_t, V_t, W_t = \mathrm{argmin}_{U,V,W} |T_t - U_t^* V_t^* W_t|^2 + \lambda_y^* \Sigma_{i,labeled} f(Y_t, U_t, M) + \lambda_M^* |M|^2 + \lambda_u^* |U_t - g(U_{t-1})|^2 + \lambda_v^* |V_t - g(V_{t-1})|^2 + \lambda_w^* |W_t - g(W_{t-1})|^2 \quad (2)$$

where $\lambda_y^* \Sigma_{i,labeled} f(Y_t, U_t, M) + \lambda_M^* |M|^2$ represents user feedback and $\lambda_u^* |U_t - g(U_{t-1})|^2 + \lambda_v^* |V_t - g(V_{t-1})|^2 + \lambda_w^* |W_t - g(W_{t-1})|^2$ represents the temporal consistency between tensor decomposition components derived at successive timesteps. The function $f$ in (2) denotes a penalization function measuring consistency between features and feedback from users (e.g., administrative users, security information users). Further the term M in (2) may be a multiplicative factor used to map user feature $U_i$ to the label space (e.g., labels given to detected events associated with a user). G in (2) may denote a regularization function measuring consistency of the factor matrices derived at a timestep t and those derived at all precedent timesteps (e.g., t−1, t−2, t−3, etc.).

In some examples, the security manager 135 may determine a reconstruction error as follows:

$$\mathrm{error} = |T_t - U_t^* V_t^* W_t|^2 \quad (3)$$

With reference to FIG. 1, the security manager 135 may define an anomaly score as follows for each user (denoted as user$_j$), rather than solely ranking a reconstruction error. For example, the security manager 135 may determine an anomaly score as follows:

$$\text{anomaly score} = \alpha^* \sigma(U_{t+1}{}^j M) + \mathrm{error}(U^j) \quad (4)$$

or alternatively as follows:

$$\text{anomaly score} = \mathrm{softmax}(U_{t+1}{}^j M) + \mathrm{error}(U^j) \quad (5)$$

The anomaly score determined according to (4) and (5) may include a measurement composed of a linear weighted combination of probabilistic prediction of U and of the reconstruction error. The term $\alpha$ in (4) may be weighting coefficient, whose value may be set either empirically or learned by the tensor model 200. Therefore, the security manager 135 may rank all users according to the derived sores to select the candidates of the users who committed potentially malicious behaviors.

Accordingly, the tensor model 200 can incrementally integrate user feedbacks as online supervision information. The inserted feedback may help to refine the tuning of the tensor model 200 (e.g., the tensor factorization-based detection model). Further the tensor model 200 may use a feedback policy for the detecting decision. Meanwhile, the tensor model 200 may also enforce the temporal consistency constraints between the representation of the users in the projection space derived from the proposed tensor factorization. This temporal consistency may help to tolerate the mild variation of user behaviors, which may be caused by benign behavior drift. As a result, the false alarm rate may be reduced.

Figure 3:
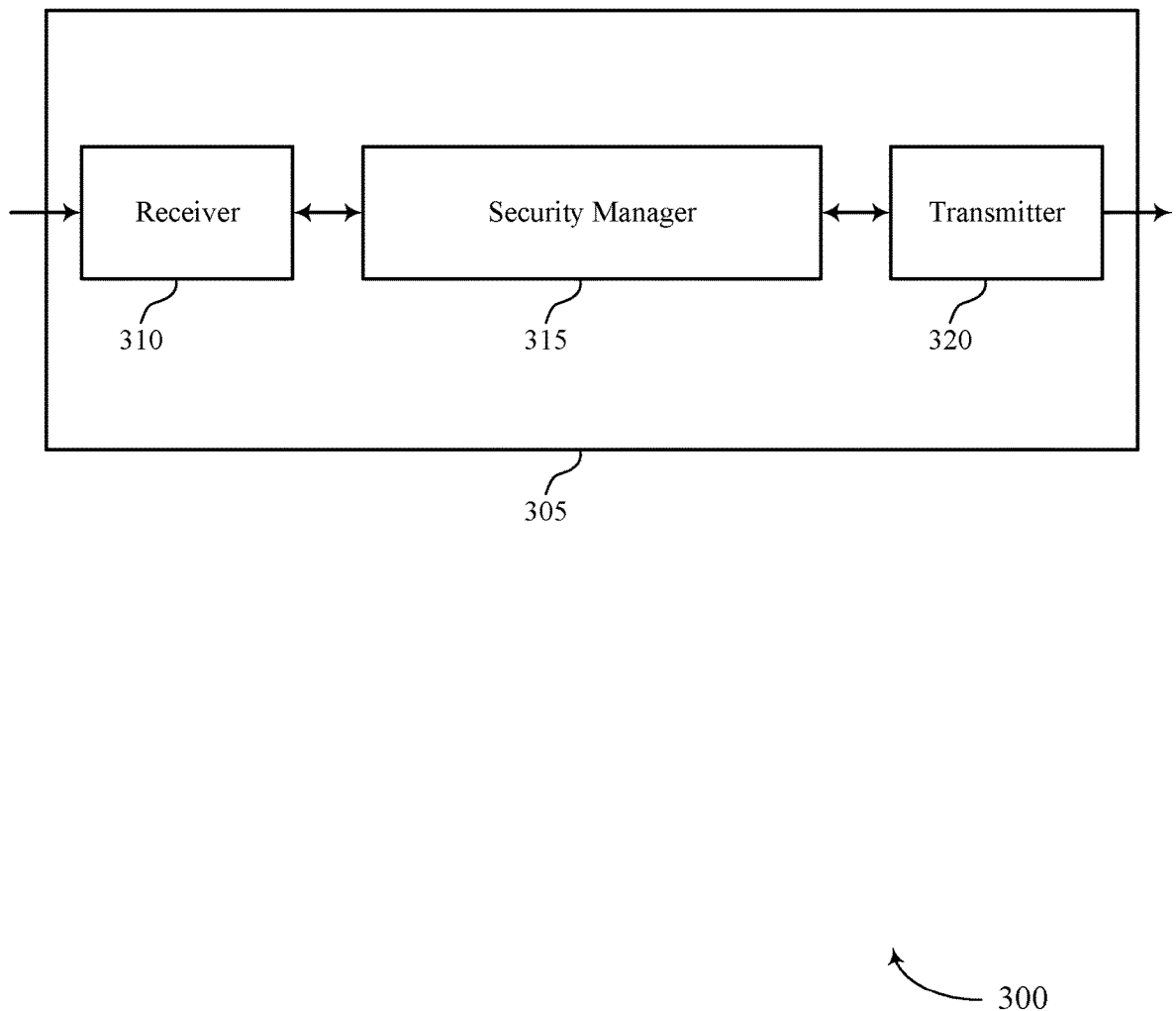
FIGS. 3 and 4 show block diagrams of devices that support abnormal user behavior detection in accordance with aspects of the present disclosure.

FIG. 3 shows a block diagram 300 of a device 305 that supports abnormal user behavior detection in accordance with aspects of the present disclosure. The device 305 may be an example of aspects of a device as described herein. The device 305 may include a receiver 310, a security manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to abnormal user behavior detection, etc.). Information may be passed on to other components of the device 305. The receiver 310 may be an example of aspects of the transceiver 620 described with reference to FIG. 6. The receiver 310 may utilize a single antenna or a set of antenna.

The security manager 315 may generate a tensor model based on a set of user information within a temporal period, where the tensor model includes a behavioral profile associated with a user of a set of users, adapt the tensor model based on feedback from an additional user of a set of additional users different from the set of users, determine that a behavior associated with the user of the set of users is abnormal based on the tensor model, and perform a security action on at least one computing device of the one or more computing devices to protect the at least one computing device against the abnormal user behavior based on the adapting. The security manager 315 may be an example of aspects of the security manager 610 described herein.

The security manager 315, or its sub-components, may be implemented in hardware, code (e.g., software or firmware) executed by a processor, or any combination thereof. If implemented in code executed by a processor, the functions of the security manager 315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The security manager 315, or its sub-components, may be physically located at various positions, including being distributed such that portions of functions are implemented at different physical locations by one or more physical components. In some examples, the security manager 315, or its sub-components, may be a separate and distinct component in accordance with various aspects of the present disclosure. In some examples, the security manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
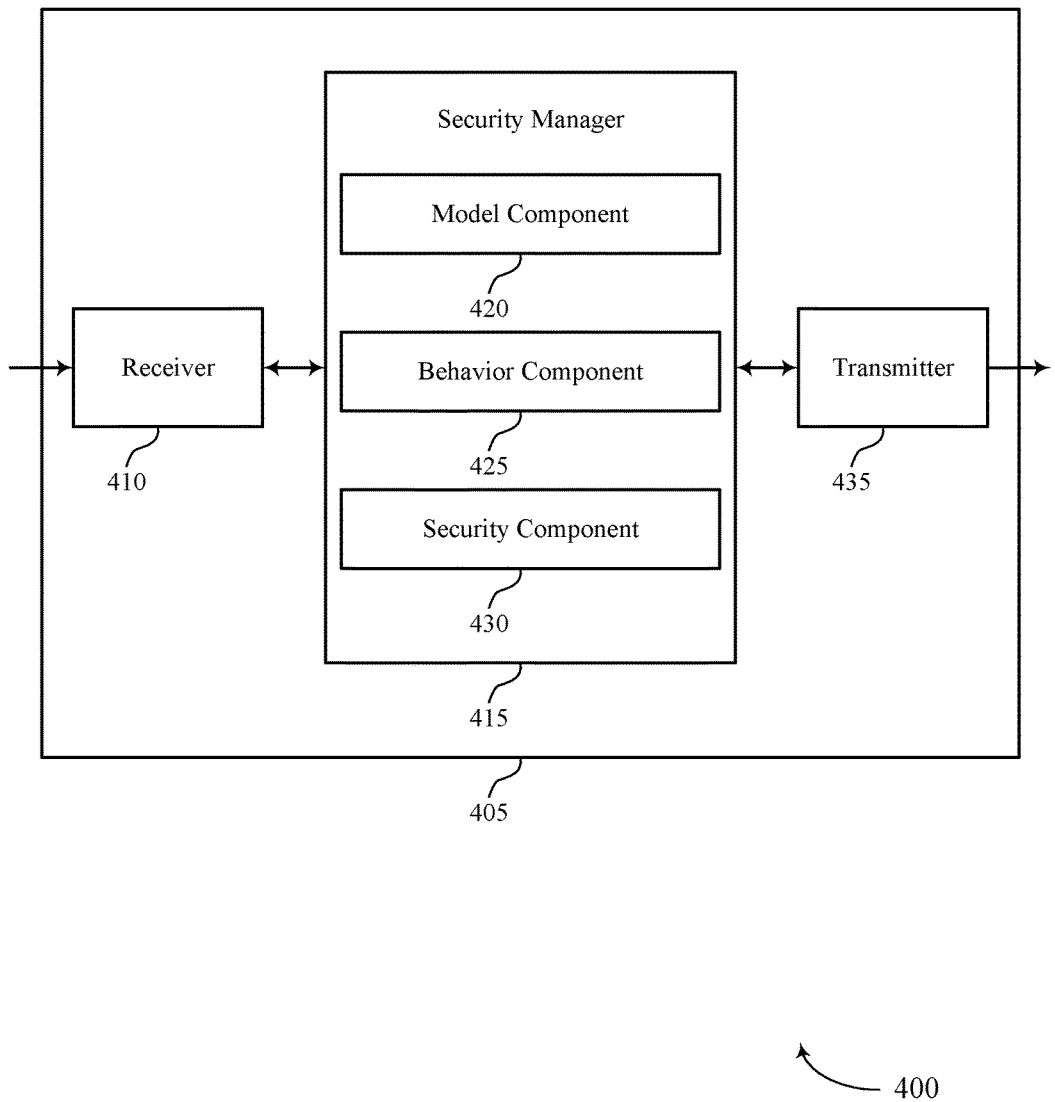

FIG. 4 shows a block diagram 400 of a device 405 that supports abnormal user behavior detection in accordance with aspects of the present disclosure. The device 405 may be an example of aspects of a device 305 or a device 115 as described herein. The device 405 may include a receiver 410, a security manager 415, and a transmitter 435. The device 405 may also include a processor. Each of these components may be in communication with one another (e.g., via one or more buses).

The receiver 410 may receive information such as packets, user data, or control information associated with various information channels (e.g., control channels, data channels, and information related to abnormal user behavior detection, etc.). Information may be passed on to other components of the device 405. The receiver 410 may be an example of aspects of the transceiver 620 described with reference to FIG. 6. The receiver 410 may utilize a single antenna or a set of antennas.

The security manager 415 may be an example of aspects of the security manager 315 as described herein. The security manager 415 may include a model component 420, a behavior component 425, and a security component 430. The security manager 415 may be an example of aspects of the security manager 610 described herein. The model component 420 may generate a tensor model based on a set of user information within a temporal period, where the tensor model includes a behavioral profile associated with a user of a set of users and adapt the tensor model based on feedback from an additional user of a set of additional users different from the set of users. The behavior component 425 may determine that a behavior associated with the user of the set of users is abnormal based on the tensor model. The security component 430 may perform a security action on at least one computing device of the one or more computing devices to protect the at least one computing device against the abnormal user behavior based on the adapting.

The transmitter 435 may transmit signals generated by other components of the device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
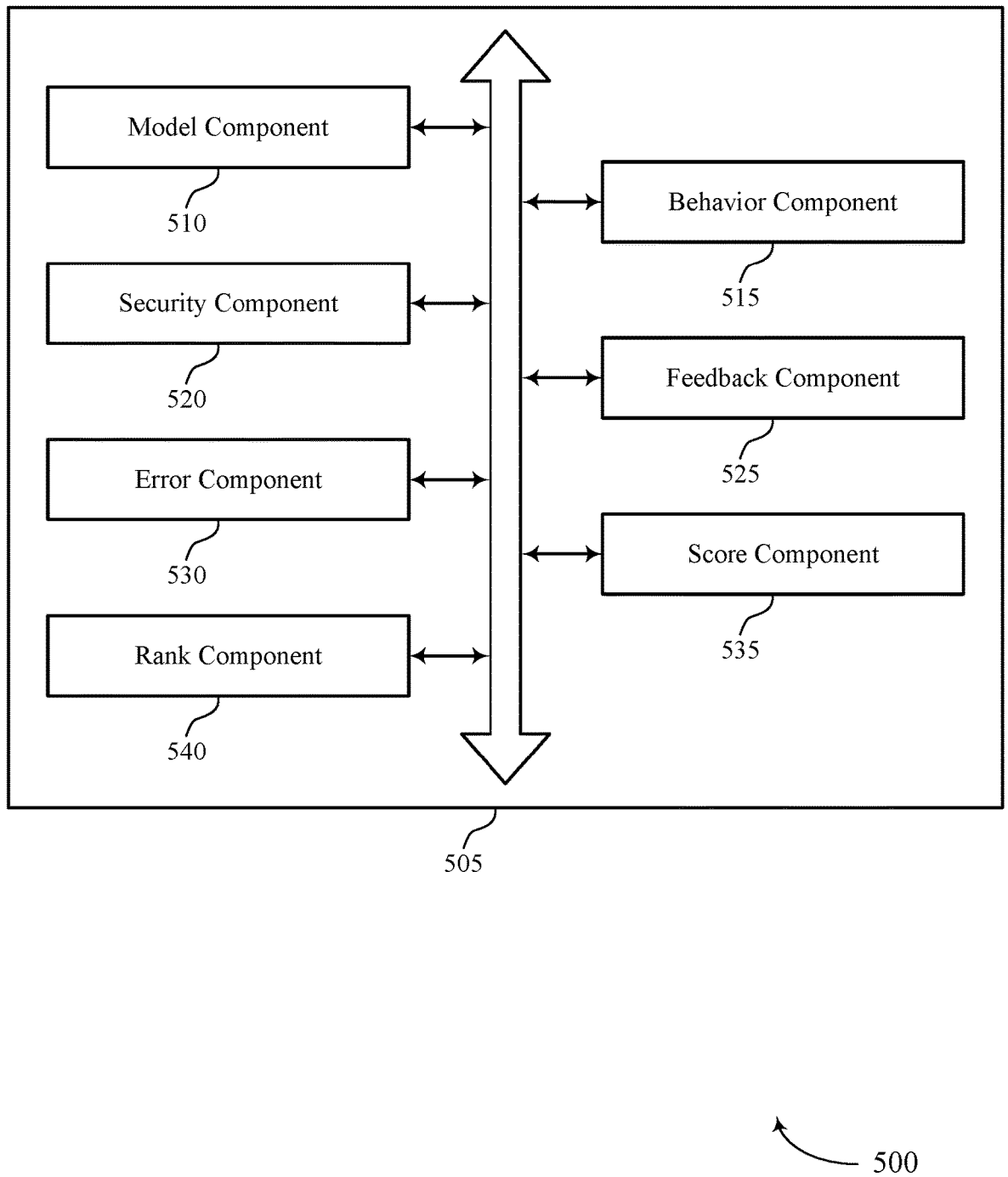
FIG. 5 shows a block diagram of a security manager that supports abnormal user behavior detection in accordance with aspects of the present disclosure.

FIG. 5 shows a block diagram 500 of a security manager 505 that supports abnormal user behavior detection in accordance with aspects of the present disclosure. The security manager 505 may be an example of aspects of a security manager 315, a security manager 415, or a security manager 610 described herein. The security manager 505 may include a model component 510, a behavior component 515, a security component 520, a feedback component 525, an error component 530, a score component 535, and a rank component 540. Each of these modules may communicate, directly or indirectly, with one another (e.g., via one or more buses).

The model component 510 may generate a tensor model based on a set of user information within a temporal period, where the tensor model includes a behavioral profile associated with a user of a set of users. In some examples, the model component 510 may adapt the tensor model based on feedback from an additional user of a set of additional users different from the set of users. In some cases, the additional user of the set of additional users may include an information security user, or an administrative user. In some cases, the set of users and the additional set of users may be part of an enterprise, such as a business enterprise.

The model component 510 may monitor, from at least one computing device from the one or more computing devices and associated with the user of the set of users, the set of user information including a user identifier of the user of the set of users, a set of application identifiers associated with one or more applications accessible by the user of the set of users, or a set of timestamp identifiers related to access to the one or more applications by the user of the set of users, or any combination thereof, where the set of user information includes the user identifier, the set of application identifiers, or the set of timestamp identifiers, or any combination thereof. In some examples, the model component 510 may correlate one or more operations associated with the user of the set of users to the one or more applications running on the at least one computing device associated with the user during one or more timestamp periods within the temporal period. In some cases, the tensor model includes one or more three-dimensional tensors, at least one of the one or more three-dimensional tensors including a set of user identifiers associated with the set of users, a set of application identifiers used by the set of users, or a set of timestamp identifiers, or any combination thereof. The set of user information may include one or more interactions of the user of the set of users with one or more cloud-based applications within the temporal period.

The behavior component 515 may determine that a behavior associated with the user of the set of users is abnormal based on the tensor model. In some examples, the behavior component 515 may determine that at least one of the one or more operations satisfy an abnormal behavior threshold.

The security component 520 may perform a security action on at least one computing device of the one or more computing devices to protect the at least one computing device against the abnormal user behavior based on the adapting. In some examples, performing the security action includes at least one of quarantining an application on the at least one computing device related to the abnormal behavior associated with the user, preventing access to a network enterprise for the at least one computing device related to the abnormal behavior associated with the user, preventing access by the user to one or more features of the at least one computing device related to the abnormal behavior associated with the user, performing a malware scan on the at least one computing device at least one computing device related to the abnormal behavior associated with the user, or any combination thereof. In some examples, the security component 520 may transmit a message including an indication of the abnormal behavior associated with the user of the set of users and a selectable option to perform a second security action including at least one of preventing access to a network enterprise for the at least one computing device, preventing access to one or more features of the at least one computing device, or performing a malware scan on the at least one computing device, or any combination thereof, where the indication further includes a user identifier, an application identifier, or a timestamp identifier, or any combination thereof associated with the abnormal behavior.

The feedback component 525 may transmit a feedback request message including an indication flagging the abnormal behavior of the user of the set of users and a selectable option to assign a classification to the abnormal behavior by the additional user of the set of additional users, where the classification includes at least one of a normal behavior, a non-malicious abnormal behavior, or a malicious abnormal behavior, or any combination thereof. In some examples, the feedback component 525 may receive a feedback response message including a second indication including the classification by the additional user of the set of additional users, where adapting the tensor model includes updating the tensor model in real-time based on the feedback response message.

The error component 530 may determine a reconstruction error of the behavioral profile associated with the user of the set of users based on the generated tensor model using the set of user information including at least one of a user identifier, a set of application identifiers, or a set of timestamp identifiers, or any combination thereof. The score component 535 may determine an anomaly score based on the reconstruction error and a regularization term associated with the set of user information including at least one of a user identifier, a set of application identifiers, or a set of timestamp identifiers, or any combination thereof. The rank component 540 may assign a ranking to the user of the set of users, where determining the abnormal behavior associated with the user of the set of users is further based on the ranking.

Figure 6:
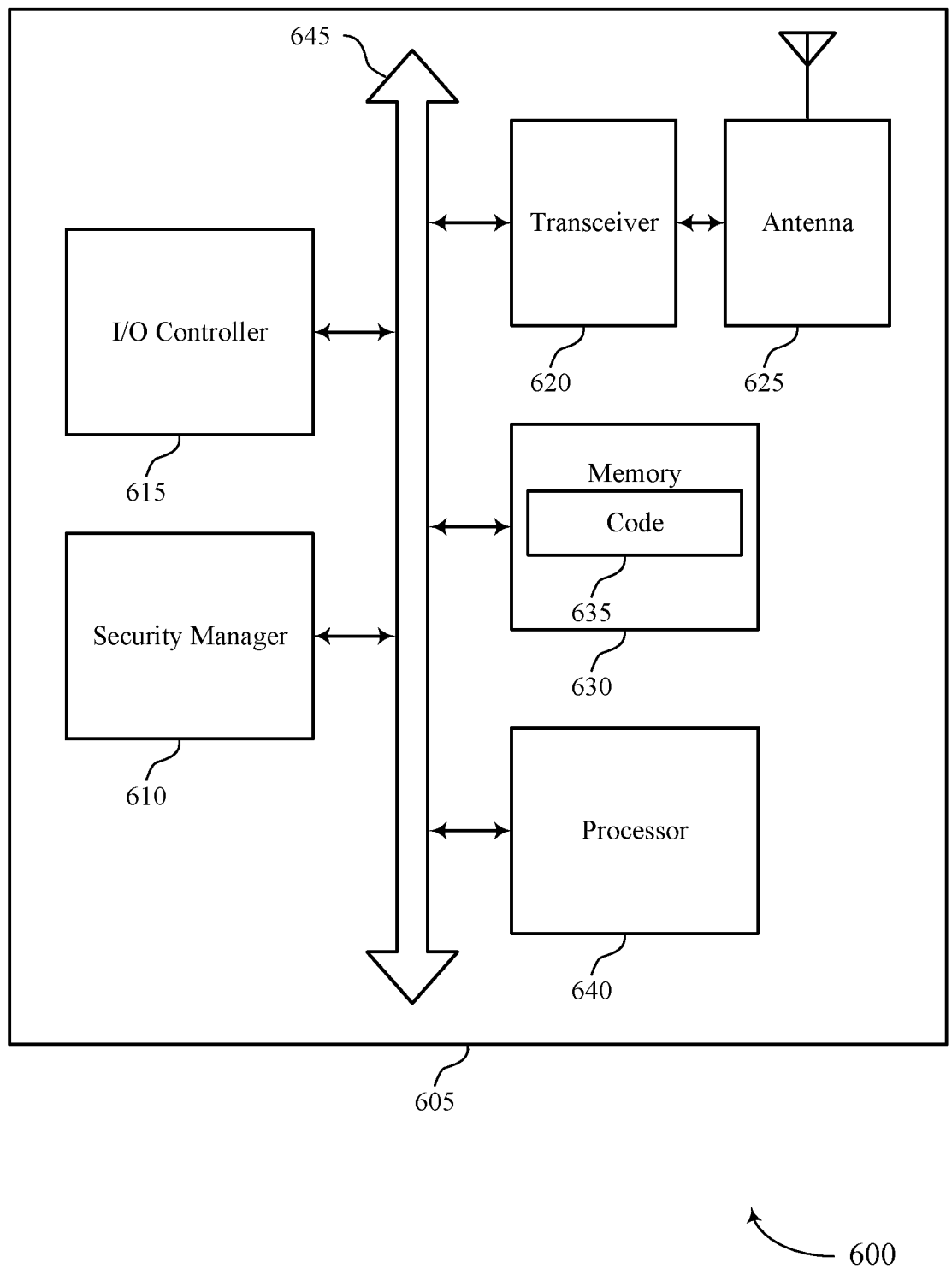
FIG. 6 illustrates block diagram of a system including a device that supports abnormal user behavior detection in accordance with aspects of the present disclosure.

FIG. 6 shows a diagram of a system 600 including a device 605 that supports abnormal user behavior detection in accordance with aspects of the present disclosure. The device 605 may be an example of or include the components of device 305, device 405, or a device as described herein. The device 605 may include components for bi-directional voice and data communications including components for transmitting and receiving communications, including a security manager 610, an I/O controller 615, a transceiver 620, an antenna 625, memory 630, and a processor 640. These components may be in electronic communication via one or more buses (e.g., bus 645).

The security manager 610 may generate a tensor model based on a set of user information within a temporal period, where the tensor model includes a behavioral profile associated with a user of a set of users, adapt the tensor model based on feedback from an additional user of a set of additional users different from the set of users, determine that a behavior associated with the user of the set of users is abnormal based on the tensor model, and perform a security action on at least one computing device of the one or more computing devices to protect the at least one computing device against the abnormal user behavior based on the adapting.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touch-screen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the device 605 may include a single antenna 625. However, in some cases the device 605 may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting abnormal user behavior detection).

The code 635 may include instructions to implement aspects of the present disclosure, including instructions to support detecting and protecting against abnormal user behavior. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
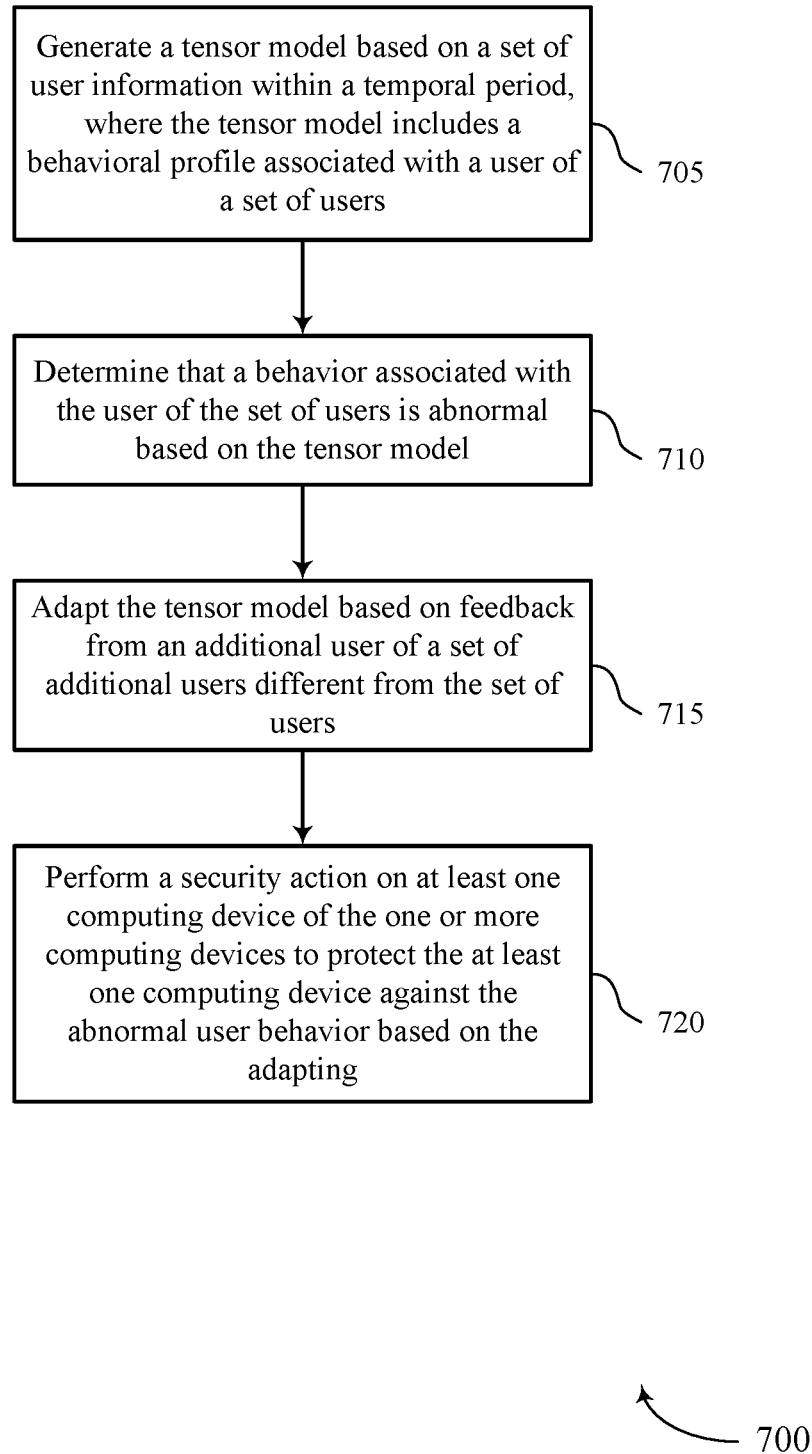
FIGS. 7 through 9 show flowcharts illustrating methods that support abnormal user behavior detection in accordance with aspects of the present disclosure.

FIG. 7 shows a flowchart illustrating a method 700 that supports abnormal user behavior detection in accordance with aspects of the present disclosure. The operations of method 700 may be implemented by a device or its components as described herein. For example, the operations of method 700 may be performed by a security manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 705, the device may generate a tensor model based on a set of user information within a temporal period, where the tensor model includes a behavioral profile associated with a user of a set of users. The operations of 705 may be performed according to the methods described herein. In some examples, aspects of the operations of 705 may be performed by a model component as described with reference to FIGS. 3 through 6.

At 710, the device may determine that a behavior associated with the user of the set of users is abnormal based on the tensor model. The operations of 710 may be performed according to the methods described herein. In some examples, aspects of the operations of 710 may be performed by a behavior component as described with reference to FIGS. 3 through 6.

At 715, the device may adapt the tensor model based on feedback from an additional user of a set of additional users different from the set of users. The operations of 715 may be performed according to the methods described herein. In some examples, aspects of the operations of 715 may be performed by a model component as described with reference to FIGS. 3 through 6.

At 720, the device may perform a security action on at least one computing device of the one or more computing devices to protect the at least one computing device against the abnormal user behavior based on the adapting. The operations of 720 may be performed according to the methods described herein. In some examples, aspects of the operations of 720 may be performed by a security component as described with reference to FIGS. 3 through 6.

Benefits of the method 700 may include enabling a device (e.g., an end user terminal, a server, a network entity, and the like) to secure data sessions associated with a cloud application, as well as protect the device against potential malicious attacks. Other benefits of the method 700 may further include reducing false alarms (e.g., false alarm rates) related to drift of user behavioral patterns.

Figure 8:
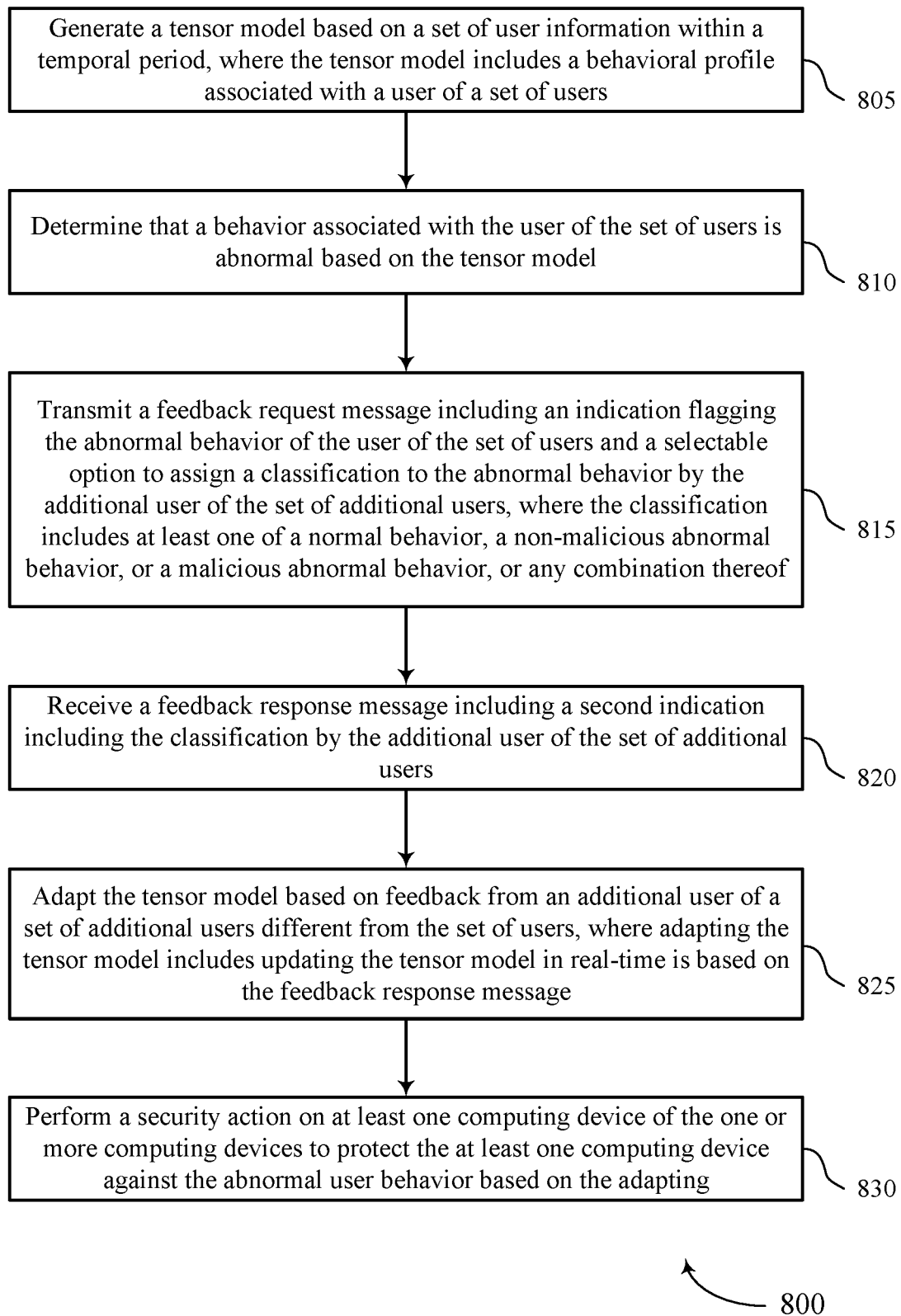

FIG. 8 shows a flowchart illustrating a method 800 that supports abnormal user behavior detection in accordance with aspects of the present disclosure. The operations of method 800 may be implemented by a device or its components as described herein. For example, the operations of method 800 may be performed by a security manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 805, the device may generate a tensor model based on a set of user information within a temporal period, where the tensor model includes a behavioral profile associated with a user of a set of users. The operations of 805 may be performed according to the methods described herein. In some examples, aspects of the operations of 805 may be performed by a model component as described with reference to FIGS. 3 through 6.

At 810, the device may determine that a behavior associated with the user of the set of users is abnormal based on the tensor model. The operations of 810 may be performed according to the methods described herein. In some examples, aspects of the operations of 810 may be performed by a behavior component as described with reference to FIGS. 3 through 6.

At 815, the device may transmit a feedback request message including an indication flagging the abnormal behavior of the user of the set of users and a selectable option to assign a classification to the abnormal behavior by the additional user of the set of additional users, where the classification includes at least one of a normal behavior, a non-malicious abnormal behavior, or a malicious abnormal behavior, or any combination thereof. The operations of 815 may be performed according to the methods described herein. In some examples, aspects of the operations of 815 may be performed by a feedback component as described with reference to FIGS. 3 through 6.

At 820, the device may receive a feedback response message including a second indication including the classification by the additional user of the set of additional users, where adapting the tensor model includes updating the tensor model in real-time based on the feedback response message. The operations of 820 may be performed according to the methods described herein. In some examples, aspects of the operations of 820 may be performed by a feedback component as described with reference to FIGS. 3 through 6.

At 825, the device may adapt the tensor model based on feedback from an additional user of a set of additional users different from the set of users. The operations of 825 may be performed according to the methods described herein. In some examples, aspects of the operations of 825 may be performed by a model component as described with reference to FIGS. 3 through 6.

At 830, the device may perform a security action on at least one computing device of the one or more computing devices to protect the at least one computing device against the abnormal user behavior based on the adapting. The operations of 830 may be performed according to the methods described herein. In some examples, aspects of the operations of 830 may be performed by a security component as described with reference to FIGS. 3 through 6.

Benefits of the method 800 may include enabling a device (e.g., an end user terminal, a server, a network entity, and the like) to determine abnormal user behavior using a learning model (e.g., a deep learning model, such as a tensor model) and perform one or more security actions to protect the device against a potential malevolent attack. Further benefits of the method 800 may include incrementally integrating user feedback to the learning model via real-time. This may include processing user feedback within milliseconds, so that the user feedback is applicable virtually immediately as feedback input to the learning model, such that the device may adapt the learning model according to the feedback input. The inserted feedback may further help to refine tuning of the learning model (e.g., a tensor factorization-based detection model). Other benefits of the method 800 may further include not having to deploy a new learning model due to the real-time user feedback applicability.

Figure 9:
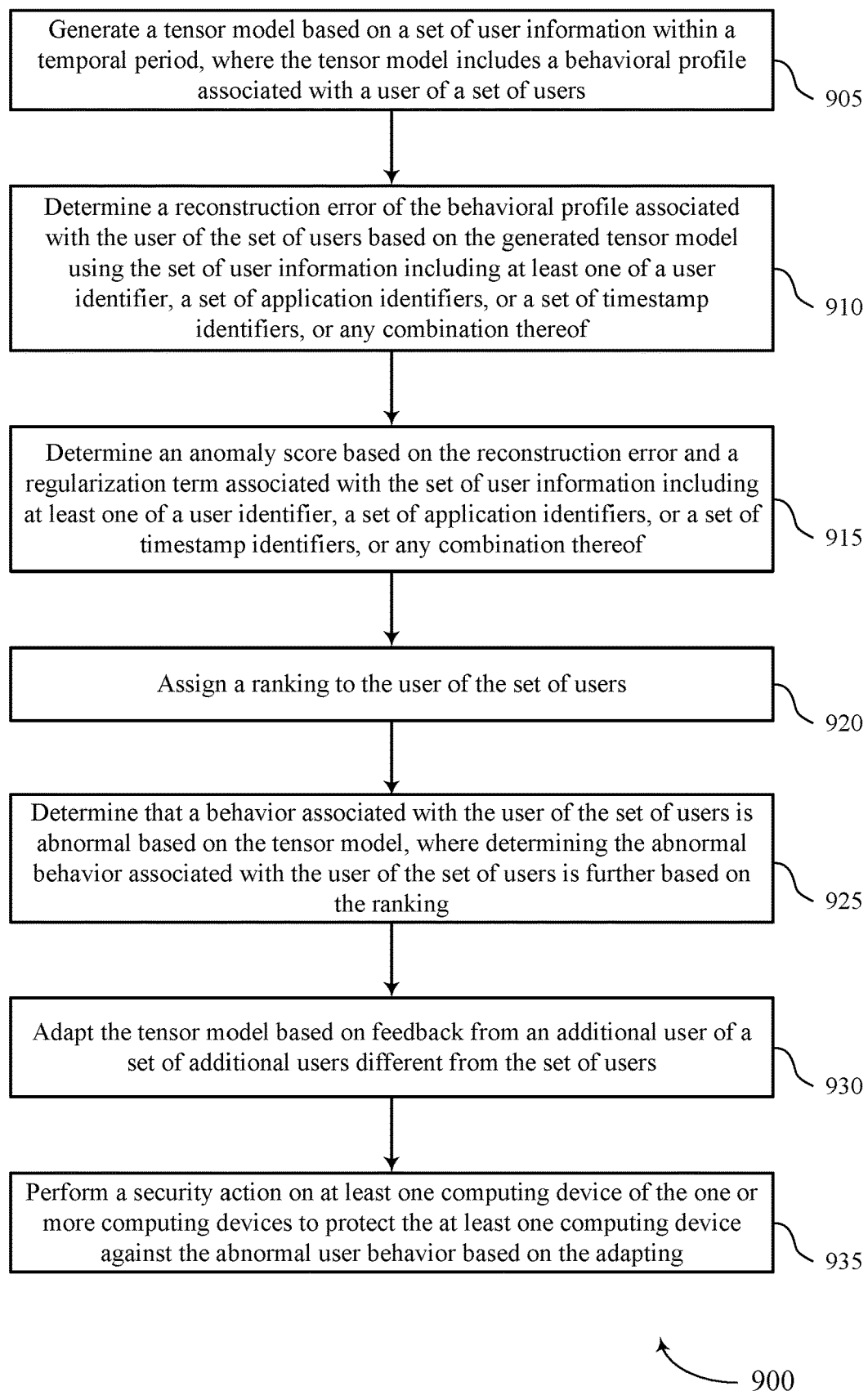

FIG. 9 shows a flowchart illustrating a method 900 that supports abnormal user behavior detection in accordance with aspects of the present disclosure. The operations of method 900 may be implemented by a device or its components as described herein. For example, the operations of method 900 may be performed by a security manager as described with reference to FIGS. 3 through 6. In some examples, a device may execute a set of instructions to control the functional elements of the device to perform the functions described below. Additionally or alternatively, a device may perform aspects of the functions described below using special-purpose hardware.

At 905, the device may generate a tensor model based on a set of user information within a temporal period, where the tensor model includes a behavioral profile associated with a user of a set of users. The operations of 905 may be performed according to the methods described herein. In some examples, aspects of the operations of 905 may be performed by a model component as described with reference to FIGS. 3 through 6.

At 910, the device may determine a reconstruction error of the behavioral profile associated with the user of the set of users based on the generated tensor model using the set of user information including at least one of a user identifier, a set of application identifiers, or a set of timestamp identifiers, or any combination thereof. The operations of 910 may be performed according to the methods described herein. In some examples, aspects of the operations of 910 may be performed by an error component as described with reference to FIGS. 3 through 6.

At 915, the device may determine an anomaly score based on the reconstruction error and a regularization term associated with the set of user information including at least one of a user identifier, a set of application identifiers, or a set of timestamp identifiers, or any combination thereof. The operations of 915 may be performed according to the methods described herein. In some examples, aspects of the operations of 915 may be performed by a score component as described with reference to FIGS. 3 through 6.

At 920, the device may assign a ranking to the user of the set of users, where determining the abnormal behavior associated with the user of the set of users is further based on the ranking. The operations of 920 may be performed according to the methods described herein. In some examples, aspects of the operations of 920 may be performed by a rank component as described with reference to FIGS. 3 through 6.

At 925, the device may determine that a behavior associated with the user of the set of users is abnormal based on the tensor model. The operations of 925 may be performed according to the methods described herein. In some examples, aspects of the operations of 925 may be performed by a behavior component as described with reference to FIGS. 3 through 6.

At 930, the device may adapt the tensor model based on feedback from an additional user of a set of additional users different from the set of users. The operations of 930 may be performed according to the methods described herein. In some examples, aspects of the operations of 930 may be performed by a model component as described with reference to FIGS. 3 through 6.

At 935, the device may perform a security action on at least one computing device of the one or more computing devices to protect the at least one computing device against the abnormal user behavior based on the adapting. The operations of 935 may be performed according to the methods described herein. In some examples, aspects of the operations of 935 may be performed by a security component as described with reference to FIGS. 3 through 6.

Benefits of the method 900 may include enabling a device (e.g., an end user terminal, a server, a network entity, and the like) to determine abnormal user behavior using a learning model (e.g., a deep learning model, such as a tensor model) and perform one or more security actions to protect the device against a potential malevolent attack. Further benefits of the method 900 may include incrementally integrating user feedback to the learning model. Other benefits of the method 900 may further include defining a feedback policy for classifying a detected abnormal behavior as potentially a normal behavior, a non-malicious abnormal behavior, or a malicious abnormal behavior, or any combination thereof. Other benefits of the method 900 may also include enforcing temporal consistency constraints between representation of users in projection space derived from proposed tensor factorization. This temporal consistency may further assist to tolerate mild variation of user behaviors, which are probably caused by benign behavior drift. As a result, the false alarm rate can be reduced.

It should be noted that the methods described herein describe possible implementations, and that the operations and the steps may be rearranged or otherwise modified and that other implementations are possible. Further, aspects from two or more of the methods may be combined.

Figure 10:
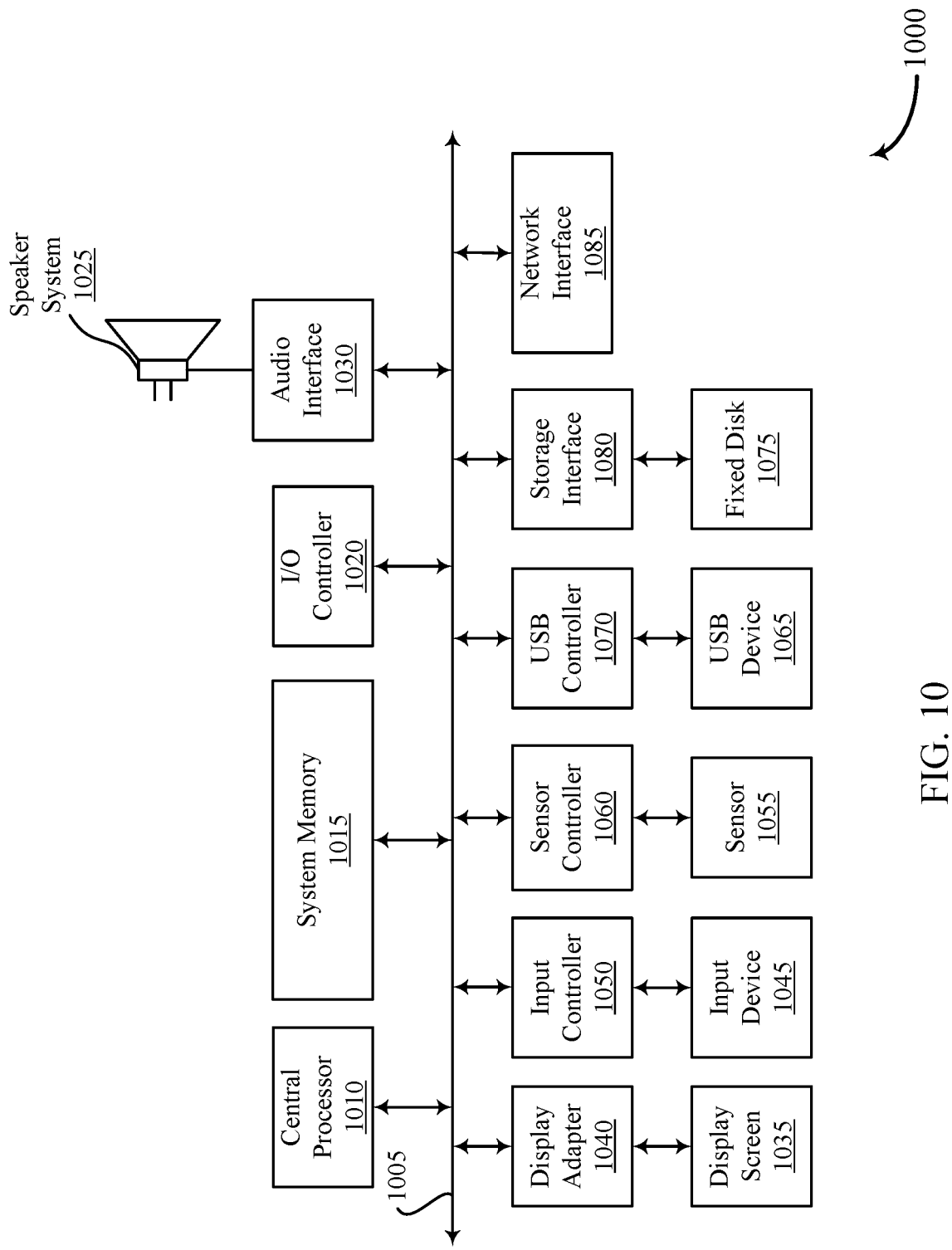
FIG. 10 illustrates a block diagram of a computing system that supports abnormal user behavior detection in accordance with aspects of the present disclosure.

FIG. 10 illustrates a block diagram of a computing system 1000 that supports abnormal user behavior detection in accordance with aspects of the present disclosure. For example, all or a portion of the computing system 1000 may perform and be a means for performing, either alone or in combination with other elements, one or more of the operations described herein (such as one or more of the operations as described in FIGS. 1 through 9). All or a portion of the computing system 1000 may also perform or be a means for performing any other operations, methods, or processes described and illustrated herein.

The computing system 1000 may be any single or multi-processor computing device or system capable of executing computer-readable instructions. The computing system 1000 may be an example of the computing device 105 or the server 120 as described with reference to FIG. 1. For example, the computing system 1000 may include, but is not limited to, workstations, laptops, client-side terminals, servers, distributed computing systems, handheld devices, or any other computing system or device.

In some cases, the computing system 1000 may include at least one central processor 1010 and a system memory 1015. The central processor 1010 may include any type or form of physical processing unit (e.g., a hardware-implemented central processing unit) capable of processing data or interpreting and executing instructions. In some cases, the central processor 1010 may receive instructions from a computer software application. These instructions may cause the central processor 1010 to perform the functions of one or more of the exemplary cases described and illustrated herein. The system memory 1015 may include any type or form of volatile or non-volatile storage device or medium capable of storing data and other computer-readable instructions. Examples of the system memory 1015 include Random Access Memory (RAM), Read Only Memory (ROM), flash memory, or any other suitable memory device. In one example, a security manager, as described with reference to FIGS. 1 through 9, may be loaded into the system memory 1015.

In some cases, the computing system 1000 may include a bus 1005 which interconnects major subsystems of the computing system 1000, such as the central processor 1010, the system memory 1015, an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a universal serial bus (USB) controller 1070), and a storage interface 1080. Also included are at least one sensor 1055 connected to the bus 1005 through a sensor controller 1060 and a network interface 1085 (coupled directly to bus 1005).

The bus 1005 allows data communication between the central processor 1010 and the system memory 1015, which may include ROM or flash memory, and RAM, as previously noted. The RAM is generally the main memory into which the operating system and application programs are loaded. The ROM or flash memory may contain, among other code, BIOS or UEFI, which controls basic hardware operation such as the interaction with peripheral components or devices. Applications (e.g., the applications 110) resident with the computing system 1000 are generally stored on and accessed via a non-transitory computer readable medium, such as a hard disk drive (e.g., a fixed disk 1075) or other storage medium. Additionally, applications may be in the form of electronic signals modulated in accordance with the application and data communication technology when accessed via the interface 1085.

The storage interface 1080, as with the other storage interfaces of the computing system 1000, may connect to a standard computer readable medium for storage and/or retrieval of information, such as the fixed disk drive 1075. The fixed disk drive 1075 may be a part of the computing system 1000 or may be separate and accessed through other interface systems. The network interface 1085 may provide a direct connection to a remote server via a direct network link to the Internet via a POP (point of presence). The network interface 1085 may provide such connection using wireless techniques, including digital cellular telephone connection, Cellular Digital Packet Data (CDPD) connection, digital satellite data connection, or the like.

Conversely, all of the devices shown in FIG. 10 need not be present to practice the present techniques. The devices and subsystems may be interconnected in different ways from that shown in FIG. 10. The aspect of some operations of a system such as that shown in FIG. 10 are readily known in the art and are not discussed in detail in this application. Code to implement the present disclosure may be stored in a non-transitory computer-readable medium such as one or more of the system memory 1015 or the fixed disk 1075. The operating system provided on the computing system 1000 may be iOS, ANDROID, MS-DOS, MS-WINDOWS, OS/2, UNIX, LINUX, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other cases of the present techniques may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there may inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with the computing system 1000 may include wireless communication signals such as radio frequency, electromagnetics, local area network (LAN), wide area network (WAN), metropolitan area network (MAN), virtual private network (VPN), wireless network (using 802.11, for example), cellular network (using 3G, Long Term Evolution (LTE), Next Generation 5G new radio (NR) for example), and/or other signals. The network interface 1085 may enable one or more of WWAN (GSM, CDMA, and WCDMA), WLAN (including BLUETOOTH and Wi-Fi), WMAN (WiMAX) for mobile communications, antennas for Wireless Personal Area Network (WPAN) applications (including RFID and UWB), etc.

The I/O controller 1020 may operate in conjunction with the network interface 1085 or the storage interface 1080, or both. The network interface 1085 may enable the computing system 600 with the ability to communicate with client devices (e.g., device 105 of FIG. 1), or other devices over the network 110 of FIG. 1, or both. The network interface 1085 may provide wired or wireless network connections, or both. In some cases, the network interface 1085 may include an Ethernet adapter or Fiber Channel adapter. The storage interface 1080 may enable the computing system 1000 to access one or more data storage devices. The one or more data storage devices may include two or more data tiers each. The storage interface 1080 may include one or more of an Ethernet adapter, a Fiber Channel adapter, Fiber Channel Protocol (FCP) adapter, a SCSI adapter, and iSCSI protocol adapter.

Figure 11:
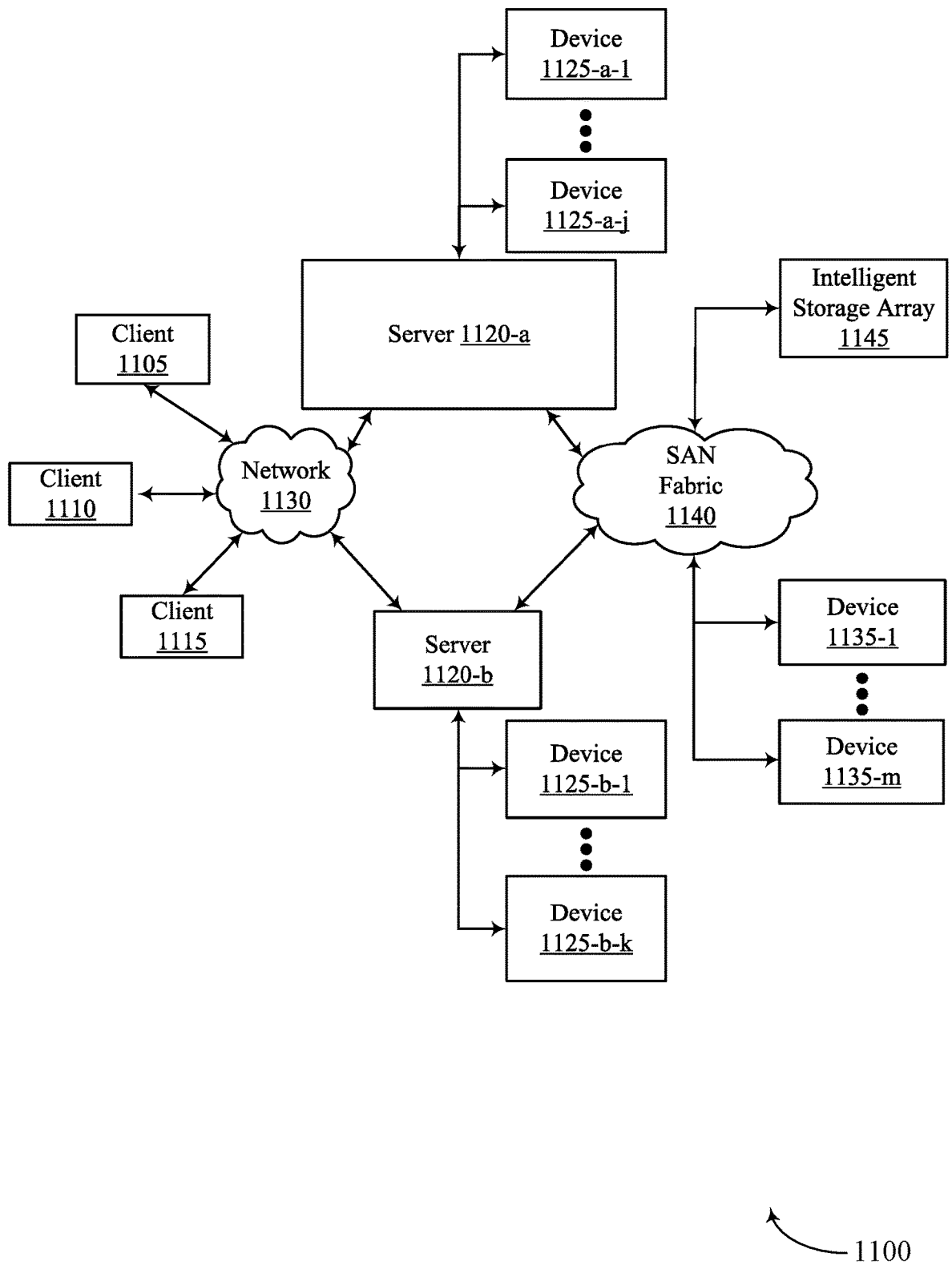
FIG. 11 illustrates a block diagram of an exemplary network architecture in which client systems and servers may be coupled to a network to support abnormal user behavior detection in accordance with aspects of the present disclosure.

FIG. 11 illustrates a block diagram of an exemplary network architecture 1100 in which client systems 1105, 1110, and 1115 and servers 1120-a and 1120-b may be coupled to a network 1130 to support abnormal user behavior detection, in accordance with aspects of the present disclosure. As provided above, all or a portion of the network architecture 1100 may perform or be a means for performing, either alone or in combination with other elements, one or more of the operations disclosed herein (such as one or more of the operations illustrated in FIGS. 1 through 10). All or a portion of network architecture 1100 may also be used to perform or be a means for performing other operations and features set forth in the present disclosure.

The client systems 1105, 1110, and 1115 may represent any type or form of computing device or system, such as exemplary in the computing system 1000 in FIG. 10. Similarly, the servers 1120-a and 1120-b may represent computing devices or systems, such as application servers or database servers, configured to provide various database services and run software applications. The network 1130 may represent any telecommunication or computer network including, for example, an intranet, a WAN, a LAN, a Personal Area Network (PAN), a cellular network (e.g., LTE, LTE-Advanced (LTE-A), Next Generation 5G NR network, or the Internet. In some cases, the client systems 1105, 1110, and 1115 and the server 1120-a or 1120-b may include all or a portion of the environment 100 from FIG. 1.

The security manager, as described with reference to FIGS. 1 through 10, may be located within one of the client systems 1105, 1110, or 1115, or any combination thereof to implement the present techniques. For example, the security manager may generate a tensor model based at least in part on a set of user information within a temporal period. In some cases, the tensor model may include a behavioral profile associated with a user of a set of users, determine that a behavior associated with the user of the set of users is abnormal based at least in part on the tensor model, adapt the tensor model based at least in part on feedback from an additional user of a set of additional users different from the set of users, and perform a security action on at least one computing device of the one or more computing devices to protect the at least one computing device against the abnormal user behavior based at least in part on the adapting. Alternatively, the application isolation manager, as described with reference to FIGS. 1 through 10, may optionally be located within one of the server 1120-a or the server 1120-b to implement the present techniques.

The server 1120-a is further depicted as having storage devices 1125-a-1 through 1125-a-j directly attached, and server 1120-b is depicted with storage devices 1125-b-1 through 1125-b-k directly attached. SAN fabric 1140 supports access to storage devices 1135-1 through 1135-m by servers 1120-a and 1120-b, and so by the client systems 1105, 1110, and 1115 via the network 1130. Intelligent storage array 1145 is also shown as an example of a specific storage device accessible via SAN fabric 1140. With reference to the computing system 1000, the network interface 1085 or some other means or method may be used to provide connectivity from each of the client systems 1105, 1110, and 1115 to the network 1130.

With reference to the computing system 600, the transceiver 625 or some other means or method may be used to provide connectivity from each of the client systems 1105, 1110, and 1115 to the network 1130. The client systems 1105, 1110, and 1115 are able to access information on the server 1120-a or the server 1120-b using, for example, a web browser or other client software. Such a client allows the client systems 1105, 1110, and 1115 to access data hosted by the server 1120-a or 1120-b or one of the storage devices 1125-a-1 through 1125-a-j, 1125-b-1 through 1125-b-k, 1135-1 through 1135-m, or the intelligent storage array 1145. FIG. 11 depicts the use of a network such as the Internet for exchanging data, but the present techniques are not limited to the Internet or any particular network-based environment.

In some cases, all or a portion of one or more of the exemplary cases disclosed herein may be encoded as a computer program and loaded onto and executed by the server 1120-a or server 1120-b, or the storage devices 1125-a-1 through 1125-a-j, the storage devices 1135-1 through 1135-m, the intelligent storage array 1145, or any combination thereof. All or a portion of one or more of the exemplary cases disclosed herein may also be encoded as a computer program, run by the server 1120-a or the stored in server 1120-b, and distributed to the client systems 1105, 1110, and 1115 over the network 1130. As detailed above, the computing system 1000 and/or one or more components of the network architecture 1100 may perform and/or be a means for performing, either alone or in combination with other elements, one or more operations of an exemplary method for securing cloud applications from computing devices.

While the foregoing disclosure sets forth various cases using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various cases have been described and/or illustrated herein in the context of fully functional computing systems, one or more of these exemplary cases may be distributed as a program product in a variety of forms, regardless of the particular type of computer-readable media used to actually carry out the distribution. The cases disclosed herein may also be implemented using software components that perform certain tasks. These software components may include script, batch, or other executable files that may be stored on a computer-readable storage medium or in a computing system. In some cases, these software components may configure a computing system to perform one or more of the exemplary cases disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific cases. However, the illustrative discussions above are not intended to be exhaustive or to limit the invention to the precise forms disclosed. Many modifications and variations are possible in view of the above teachings. The cases were chosen and described in order to best explain the principles of the present techniques and their practical applications, to thereby enable others skilled in the art to best utilize the present techniques and various cases with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for detecting and protecting against abnormal user behavior, the method being performed by one or more computing devices comprising at least one processor, the method comprising:

generating a tensor model based at least in part on a set of user information within a temporal period, wherein the tensor model comprises a behavioral profile associated with a user of a set of users;

determining that a behavior associated with the user of the set of users is abnormal based at least in part on the tensor model;

adapting the tensor model based at least in part on feedback from an additional user of a set of additional users different from the set of users; and performing a security action on at least one computing device of the one or more computing devices to protect the at least one computing device against the abnormal user behavior based at least in part on the adapting.

2. The method of claim 1, wherein the tensor model comprises one or more three-dimensional tensors, at least one of the one or more three-dimensional tensors comprising a set of user identifiers associated with the set of users, a set of application identifiers used by the set of users, or a set of timestamp identifiers, or any combination thereof.

3. The method of claim 1, wherein generating the tensor model comprises:

monitoring, from at least one computing device from the one or more computing devices and associated with the user of the set of users, the set of user information comprising a user identifier of the user of the set of users, a set of application identifiers associated with one or more applications accessible by the user of the set of users, or a set of timestamp identifiers related to access to the one or more applications by the user of the set of users, or any combination thereof, wherein the set of user information comprises the user identifier, the set of application identifiers, or the set of timestamp identifiers, or any combination thereof.

4. The method of claim 3, wherein generating the tensor model comprises:

correlating one or more operations associated with the user of the set of users to the one or more applications running on the at least one computing device associated with the user during one or more timestamp periods within the temporal period.

5. The method of claim 4, wherein determining the abnormal behavior associated with the user of the set of users comprises:

determining that at least one of the one or more operations satisfy an abnormal behavior threshold.

6. The method of claim 1, wherein adapting the tensor model comprises:
transmitting a feedback request message comprising an indication flagging the abnormal behavior of the user of the set of users and a selectable option to assign a classification to the abnormal behavior by the additional user of the set of additional users,
wherein the classification comprises at least one of a normal behavior, a non-malicious abnormal behavior, or a malicious abnormal behavior, or any combination thereof.

7. The method of claim 6, further comprising:
receiving a feedback response message comprising a second indication including the classification by the additional user of the set of additional users,
wherein adapting the tensor model comprises updating the tensor model in real-time based at least in part on the feedback response message.

8. The method of claim 1, further comprising:
determining a reconstruction error of the behavioral profile associated with the user of the set of users based at least in part on the generated tensor model using the set of user information comprising at least one of a user identifier, a set of application identifiers, or a set of timestamp identifiers, or any combination thereof;
determining an anomaly score based at least in part on the reconstruction error and a regularization term associated with the set of user information comprising at least one of a user identifier, a set of application identifiers, or a set of timestamp identifiers, or any combination thereof; and
assigning a ranking to the user of the set of users,
wherein determining the abnormal behavior associated with the user of the set of users is further based at least in part on the ranking.

9. The method of claim 1, wherein performing the security action comprises: at least one of quarantining an application on the at least one computing device related to the abnormal behavior associated with the user, preventing access to a network enterprise for the at least one computing device related to the abnormal behavior associated with the user, preventing access by the user to one or more features of the at least one computing device related to the abnormal behavior associated with the user, performing a malware scan on the at least one computing device at least one computing device related to the abnormal behavior associated with the user, or any combination thereof.

10. The method of claim 1, wherein performing the security action comprises:
transmitting a message comprising an indication of the abnormal behavior associated with the user of the set of users and a selectable option to perform a second security action comprising at least one of preventing access to a network enterprise for the at least one computing device, preventing access to one or more features of the at least one computing device, or performing a malware scan on the at least one computing device, or any combination thereof,
wherein the indication further comprises a user identifier, an application identifier, or a timestamp identifier, or any combination thereof associated with the abnormal behavior.

11. The method of claim 1, wherein the set of user information comprises one or more interactions of the user of the set of users with one or more cloud-based applications within the temporal period.

12. The method of claim 1, wherein:
the additional user of the set of additional users comprises an information security user; and
the set of users and at least one of the additional set of users being associated with an enterprise.

13. A computing device configured for detecting and protecting against abnormal user behavior, further comprising:
one or more processors;
memory in electronic communication with the one or more processors, wherein the memory stores computer executable instructions that when executed by the one or more processors cause the one or more processors to:
generate a tensor model based at least in part on a set of user information within a temporal period, wherein the tensor model comprises a behavioral profile associated with a user of a set of users;
determine that a behavior associated with the user of the set of users is abnormal based at least in part on the tensor model;
adapt the tensor model based at least in part on feedback from an additional user of a set of additional users different from the set of users; and
perform a security action on the computing device to protect the computing device against the abnormal user behavior based at least in part on the adapting.

14. The computing device of claim 13, wherein the tensor model comprises one or more three-dimensional tensors, at least one of the one or more three-dimensional tensors comprising a set of user identifiers associated with the set of users, a set of application identifiers used by the set of users, or a set of timestamp identifiers, or any combination thereof.

15. The computing device of claim 13, wherein the instructions to generate the tensor model are executable by the processor to cause the computing device to:
monitor the set of user information comprising a user identifier of the user of the set of users, a set of application identifiers associated with one or more applications accessible by the user of the set of users, or a set of timestamp identifiers related to access to the one or more applications by the user of the set of users, or any combination thereof,
wherein the set of user information comprises the user identifier, the set of application identifiers, or the set of timestamp identifiers, or any combination thereof.

16. The computing device of claim 15, wherein the instructions to generate the tensor model are executable by the processor to cause the computing device to:
correlate one or more operations associated with the user of the set of users to the one or more applications running on the computing device associated with the user during one or more timestamp periods within the temporal period.

17. The computing device of claim 16, wherein the instructions to determine the abnormal behavior associated with the user of the set of users are executable by the processor to cause the computing device to:
determine that at least one of the one or more operations satisfy an abnormal behavior threshold.

18. The computing device of claim 13, wherein the instructions to adapt the tensor model are executable by the processor to cause the computing device to:

transmit a feedback request message comprising an indication flagging the abnormal behavior of the user of the set of users and a selectable option to assign a classification to the abnormal behavior by the additional user of the set of additional users, wherein the classification comprises at least one of a normal behavior, a non-malicious abnormal behavior, or a malicious abnormal behavior, or any combination thereof.

19. The computing device of claim 18, wherein the instructions are further executable by the processor to cause the computing device to:

receive a feedback response message comprising a second indication including the classification by the additional user of the set of additional users, wherein adapting the tensor model is executable by the processor to cause the computing device to update the tensor model in real-time based at least in part on the feedback response message.

20. A non-transitory computer-readable medium storing code for detecting and protecting against abnormal user behavior, the method being performed by one or more computing devices comprising at least one processor, the method comprising, the code comprising instructions executable by a processor to:

generate a tensor model based at least in part on a set of user information within a temporal period, wherein the tensor model comprises a behavioral profile associated with a user of a set of users;

determine that a behavior associated with the user of the set of users is abnormal based at least in part on the tensor model;

adapt the tensor model based at least in part on feedback from an additional user of a set of additional users different from the set of users; and perform a security action on at least one computing device of the one or more computing devices to protect the at least one computing device against the abnormal user behavior based at least in part on the adapting.

* * * * *